US006784827B2

(12) United States Patent
Hirt

(10) Patent No.: US 6,784,827 B2
(45) Date of Patent: Aug. 31, 2004

(54) DETERMINING A TIME OF ARRIVAL OF A SENT SIGNAL

(75) Inventor: Walter Hirt, Wettswil (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/328,133

(22) Filed: Dec. 20, 2002

(65) Prior Publication Data

US 2003/0174086 A1 Sep. 18, 2003

(30) Foreign Application Priority Data

Dec. 21, 2001  (EP) .......................................... 01811261

(51) Int. Cl.$^7$ ............................. G01S 13/74; G01S 3/02
(52) U.S. Cl. ........................ 342/42; 342/463; 342/453
(58) Field of Search ........................... 342/42, 44, 386, 342/450, 453, 458, 463, 464, 465; 356/3.013, 5.15

(56) References Cited

U.S. PATENT DOCUMENTS

| | | | | |
|---|---|---|---|---|
| 4,040,054 A | * | 8/1977 | Overman | 342/13 |
| 4,433,335 A | * | 2/1984 | Wind | 342/463 |
| 5,099,245 A | * | 3/1992 | Sagey | 342/357.01 |
| 5,534,876 A | * | 7/1996 | Erickson et al. | 342/387 |
| 6,018,312 A | * | 1/2000 | Haworth | 342/353 |
| 6,028,551 A | | 2/2000 | Schoen et al. | |

(List continued on next page.)

OTHER PUBLICATIONS

"Hyperbolic location errors due to insufficient numbers of receivers," by John L. Spiesberger, published in *Journal of the Acoustical society of America*, 109 (6), Jun. 2001.

(List continued on next page.)

Primary Examiner—Thomas H. Tarcza
Assistant Examiner—Brian K Andrea
(74) Attorney, Agent, or Firm—Derek S. Jennings

(57) ABSTRACT

The present invention provides an apparatus, method, and system for determining a time of arrival (TOA) and time differences of arrival (TDOA) of a transmitted signal {S} receivable at different locations of known spatial coordinates. The system comprises a first transmitter 10 with a respective antenna feed point positioned at an a priori unknown location P and emitting a first signal {S}. The system includes furthermore a set of transceivers or transponder units 20, 30 comprising first receivers 22, 32 for receiving first signals {S} by means of respective antennas with feed points located at known locations $L_n$. Such system also comprises second transmitters 26, 36 emitting respective derived second signals $\{\tilde{S}_n\}$ after known and scheduled respective time intervals $\delta_n$ as measurable between the feed points of said respective first receiving antennas located at known locations $L_n$ and respective second transmitting antenna located at locations $L'_n$. A set of second receivers 42, 52 receives respective second signals $\{\tilde{S}_n\}$ after known respective time intervals $\tau_n$ measured between the feed points of the second transmitting antennas and feed points of second receiving antennas. A controller 46 terminates the measurement cycle for each first transmitter 10 to define total signal transfer times and then sends to a processing unit 48 an ensemble of derived third signals $\{\hat{S}_n\}$, after some known respective delay times $\Delta T_n$. Said delay times $\Delta T_n$ are measured between the time one third signal $\{\hat{S}\}$ passes the feed point of the respective second receiving antenna and the time instant where the respective single time reference $T_0$ issued by the controller 46 terminates the measurement cycle. The set of third signals $\{\hat{S}_n\}$ received by the processing unit 48 contains sufficient information for determining the time of arrival (TOA) and time differences of arrival (TDOA) and to compute $\hat{P}$, an estimate of the a priori unknown location P of a mobile radio terminal or radio tag emitting the first signal {S}.

10 Claims, 14 Drawing Sheets

U.S. PATENT DOCUMENTS

| | | | |
|---|---|---|---|
| 6,054,950 A | | 4/2000 | Fontana |
| 6,285,318 B1 | * | 9/2001 | Schoen et al. .......... 342/357.16 |
| 6,512,478 B1 | * | 1/2003 | Chien ..................... 342/357.09 |
| 6,529,156 B2 | * | 3/2003 | Morchel et al. ............ 342/172 |
| 6,608,593 B2 | * | 8/2003 | Holt ........................... 342/453 |

OTHER PUBLICATIONS

"Performance of ultrawideband SSMA using time hopping and M–ary PPM," by Fernando Ramirez–Mireles, published in *IEEE Journal on selected Areas in Communications,* vol. 19, No. 6, Jun. 2001.

"Indoor Geolocation using OFDM Signals in HIPERLAN/2 Wireless LANs," by Xinrong Li et al., published in Proceedings of the 11th International Symposium on Personal, Indoor and Mobile Radio Communication (PIMRC 2000), vol. 2, p. 1449–1453; London, Sep. 18–21, 2000.

"An Overview of Wireless Indoor Geolocation Techniques and Systems," by Kaveh Pahlavan et al., published in *Proceedings of Mobile and Wireless Communications Networks* (MWCN 2000), Paris, France, May 2000.

* cited by examiner

DETERMINING A TIME OF ARRIVAL OF A SENT SIGNAL

TECHNICAL FIELD

The present invention is related to an apparatus, method, and system for determining a time of arrival, hereinafter abbreviated to TOA, of a transmitted or emitted signal receivable at different locations of known spatial coordinates. More particularly, the invention allows to determine time differences of arrival, hereinafter abbreviated to TDOA. Furthermore, the present invention relates to location-aware or location-based applications built upon wireless networking systems or wireless tag tracking systems.

BACKGROUND OF THE INVENTION

Newly emerging indoor wireless systems supporting precise and nearly real-time localization and tracking of multiple mobile radio terminals or radio tags require capabilities for accurate measurement of TOA and TDOA of a radio signal receivable at different spatial locations. In particular, wireless local area networks known today have not been designed to sufficiently accommodate these required capabilities and thus often provide insufficient support for location-aware or location-based applications. It would be an advantage if TOA and TDOA measurements could be performed without need for absolute time synchronization between system components located at different spatial positions.

A well-known technique for locating a signal source is based on measuring the difference in time for a signal to travel to a pair of spatially separated receivers of known position. When using a sufficient number of different pairs of receivers ambiguous location solutions can be avoided and the location of the signal source can be found at the corresponding intersection of hyperbolas or hyperboloids. Besides the specific geometric constellation of the receivers and observed signal source as well as the accuracy with which the fixed receiver locations have been measured, the accuracy with which the location of the signal source can be determined depends also critically on the achievable accuracy of the TDOA measurements. Moreover, the timeliness of the obtained location solution is dictated by the delay between time of emission of the signal and time of availability of the location solution. In some cases, it may also be desirable to determine the absolute TOA of the signal at the individual receivers. A plurality of techniques and applications exist that use either radio signals, optical signals, or acoustic signals, and perform TDOA measurements for the determination of the spatial coordinates of the respective sources emitting any such signals.

The paper entitled "Hyperbolic location errors due to insufficient numbers of receivers," by John L. Spiesberger, published in *Journal of the Acoustical Society of America*, 109 (6), June 2001, is related to location techniques based on the difference in travel time of acoustical sources at pairs of widely separated receivers. Therein, the author demonstrates that ambiguous location solutions based on TDOA measurements for two and three spatial dimensions can generally only be avoided by using four and five receivers, respectively. This paper provides a theoretical method to compute the location of an acoustic signal source based on TDOA measurements from up to four independent pairs of receiving stations. However, the paper does not discuss nor disclose any practical solution that could be used for useful TDOA measurements.

U.S. Pat. No. 6,054,950 is related to an ultra wideband precision geolocation system. The system includes N>2 untethered ultra wideband transceivers, hereinafter abbreviated to UWB transceivers, located at fixed positions, an untethered UWB transceiver at the unknown target location (herein also called the unknown location of the signal source), and a processor at the target location. The latter resolves time-of-flight measurement ambiguities of received pulses to determine the geolocation by solving a set of equations according to time-of-flight measurements and surveyed positions of N−1 receivers. To eliminate a clock distribution system, self-synchronizing of pulse timing is achieved by generating a start pulse at one of the untethered transceivers. As an alternate means, a timing source may be provided at the transceivers by a Global Positioning System, hereinafter abbreviated to GPS, or other timing generator, in order to synchronize emissions of their pulses. The system has the disadvantage that it is restricted to situations where both the signal source and the processor estimating the a priori unknown location of the signal source must be located at the same spatial position. Thus, the system is restricted to the known "mobile-based architecture". Also, to eliminate a clock distribution system for time synchronization, the system described in U.S. Pat. No. 6,054,950 has the disadvantage that self-synchronization of pulse timing is achieved in a sequential fashion. An alternate synchronization method as disclosed in U.S. Pat. No. 6,054,950 has the disadvantage that each reference transceiver is required to provide its own GPS-derived absolute timing source.

U.S. Pat. No. 6,028,551 describes a micro-miniature beacon transmit-only geolocation emergency system for personal security, which can operate synergistically with existing or newly designed satellite or ground-based wireless communication networks. The document also discloses a program procedure to calculate the geolocation of the micro-miniature beacon from TDOA measurements at the satellites and initial estimates of the location. The FIGS. 2 and 9 in U.S. Pat. No. 6,028,551 show a configuration or mode of operation of a system architecture that is commonly identified by those knowledgeable in the field as a "network-centric architecture." The document proposes in general terms the use of a traditional and well-known radio-astronomy technique, called auto-correlation, to determine the time difference of signals detected at three or more satellites.

The paper entitled "Performance of ultrawideband SSMA using time hopping and M-ary PPM," by Fernando Ramirez-Mireles, published in *IEEE Journal on Selected Areas in Communications*, Vol. 19, No. 6, June 2001, analyzes multiple-access performance in free-space propagation conditions, in terms of the number of users supported by the system for a given bit error rate, the signal-to-noise ratio, the bit transmission rate, and the number of signals in a set of pulse position modulated signals.

In the paper entitled "Indoor Geolocation using OFDM Signals in HIPERLAN/2 Wireless LANs," by Xinrong Li, et al, published in *Proceedings of the 11$^{th}$ International Symposium on Personal, Indoor and Mobile Radio Communication (PIMRC 2000)*, Vol. 2, London, Sep. 18–21, 2000, the authors study and describe new methods to integrate geolocation functionalities into next generation wireless LANs based on OFDM (orthogonal frequency division multiplexed) signals. In particular, the authors propose a method to measure geolocation metrics by exploiting the HIPERLAN/2 MAC frame structure with a focus on geolocation methods for network-based architectures. This paper reports results from computer simulations to show the performance of the investigated geolocation system. The HIPERLAN/2 system is specified to operate in the 5 GHz frequency range and support short-range broadband wireless access within 30 m in typical indoor environments. The authors conclude that their system has the disadvantage of a large mean ranging error of 3 m to 7.5 m, depending on channel conditions. They further conclude that some other timing method is needed to improve the accuracy in real multi-path indoor environments.

The paper entitled "An Overview of Wireless Indoor Geolocation Techniques and Systems," by Kaveh Pahlavan, et al, published in *Proceedings of Mobile and Wireless Communications Networks (MWCN* 2000), Paris, France, May 2000, provides an overview of various indoor geolocation systems, including results on predicted performance of such systems. The paper points out that compared to the TOA method, the main advantage of the TDOA method is that knowledge of the transmit time from the transmitting source to be located is not required, while the TOA method does require this information. The paper also states, however, that with TDOA strict time synchronization among all the receivers is required. The paper further shows that available channel bandwidth fundamentally influences the achievable accuracy of indoor geolocation systems. For example, it is shown that an accuracy of less than 1.5 m requires a bandwidth of more than 20 MHz. Thus, present systems with limited bandwidth and limited range of some 30 m are limited to relative position errors of no less than 5%, and the relative position error increases significantly with decreasing range.

Therefore, in view on the mentioned documents, a need exists for a practical solution for precise and timely determination of TOA at individual receiving stations and determination of TDOA at pairs of receiving stations, where the solution is not limited or restricted by:

a strictly "mobile-based architecture", sequential time synchronization of communicating stations, a need for reference transceivers with on-board GPS-derived absolute timing source, large absolute and relative mean ranging errors in real multi-path environments, a need for strict distributed time synchronization among all the receivers.

OBJECT OF THE INVENTION

A feature of the present invention is to overcome the disadvantages and the limitations of the prior art.

Another feature of the present invention is to determine a time of arrival at one location or several locations, of a signal transmitted from an a priori unknown location at an arbitrary time.

Still another feature of the present invention is to determine a time difference of arrival at two or more locations, of a signal transmitted from an a priori unknown location at an arbitrary time.

SUMMARY AND ADVANTAGES OF THE INVENTION

The present invention provides a solution for determining a time of arrival $t_n$, abbreviated to TOA, and if desirable the absolute TOA, of one or a plurality of signals emitted by one or a plurality of transmitters, e.g. terminals or radio tags, and receivable at different locations of known spatial coordinates. In particular, the solution is based on measuring and comparing the total signal transfer time (TSTT) of signals, in such a way that explicit knowledge of absolute time or absolute time synchronization between system components located at different spatial positions is not required.

In accordance with the present invention, there is provided a system, method, and apparatus for determining the time of arrival $t_n$ of a transmitted signal $\{S\}$. The transmitted signal $\{S\}$ is receivable at different receiving locations L, the signal $\{S\}$ being transmittable by a first transmitter. In one aspect of the present invention the apparatus comprises at least two transponder units, each comprising a first receiver for receiving the transmitted signal $\{S\}$, a time-processing unit coupled to the first receiver for generating, in response to receipt of the transmitted signal $\{S\}$ by the first receiver, a first time-count value $\delta_n$, and for scheduling transmission of a time-processed signal $\{\tilde{S}_n\}$, which is based on the transmitted signal $\{S\}$, in dependence on the time-count value $(\delta_n)$ and a transmitter for transmitting the time-processed signal $\{\tilde{S}_n\}$ from a transmission location $L'_n$. The apparatus further comprises an evaluation unit. The evaluation unit comprises a second receiver for receiving the time-processed signal $\{\tilde{S}_n\}$ after a determinable time-delay value $\tau_n$, a timer unit coupled to the second receiver for generating, in response to receipt of the time-processed signal $\{\tilde{S}_n\}$ by the second receiver, a second time-count value $\Delta T_n$, a controller for generating a time reference $T_0$ for the timer unit, and a processing unit for deriving the time of arrival $t_n$ based on the time reference $T_0$ from the first time-count value $\delta_n$, the time-delay value $\tau_n$, and the second time-count value $\Delta T_n$.

It can be advantageous if the time reference $T_0$ is an absolute time reference, because then also the time of arrival $t_n$ can be determined as an absolute time of arrival.

From at least two of the derived time of arrival $t_n$ or absolute time of arrival a time difference of arrival (TDOA) can easily be calculated by calculating the difference. The transmitted signal $\{S\}$ can comprise a first transmitter identification information. This is advantageous when multiple first transmitters are used, because then each first transmitter can be uniquely identified.

The time-processed signal $\{\tilde{S}_n\}$ can comprise a second transmitter identification information, the first transmitter identification information, and the first time-count value $\delta_n$. Then the time-processed signal $\{\tilde{S}_n\}$ is easily distinguishable and the contained information can be processed immediately.

It is advantageous when the determinable time-delay value $\tau_n$ is derivable for a given geometrical arrangement of the transponder units, because then the determinable time-delay value $\tau_n$ is determined or measured only once instead of several times and therefore a faster processing can be achieved.

A network-centric architecture is assumed with the accompanying advantage that a mobile station does not need to extract location metrics from received signals transmitted by a network of stations and also does not require a processor to compute an estimate of its spatial location. Rather, a transmitter of a mobile radio terminal or radio tag simply emits, independent of other possible radio terminals or radio tags, a suitably identifiable signal that is receivable at different receiving locations L. Basically, only the network-side of the system includes a processor or processing unit to provide estimates of the spatial location of an observed mobile signal source. If desired, a mobile signal source may in addition be equipped with a suitable receiver to become a mobile transceiver or transponder unit that can also receive estimates of its spatial location as computed and transmitted by the network-side.

In general, the system comprises a set of first transmitters where the antenna feed point of each first transmitter is positioned at an a priori unknown spatial location. Each transmitted signal $\{S\}$, also referred to as first signal $\{S\}$, emitted in an independent and uncoordinated fashion according to the principles of code division multiple access (CDMA), carries at least information for the unique identification of the particular first transmitter, i.e. the first transmitter identification information. The system further includes at least two transponder units, each unit comprising the first receiver capable of receiving the first signal $\{S\}$ by means of an antenna having a feed point located at an a priori known spatial location, and the second transmitter emitting the time-processed signal $\{\tilde{S}_n\}$, also referred to as second signal $\{\tilde{S}_n\}$, derived from the received first signal $\{S\}$. A link between any first transmitter and any first receiver will hereafter be referred to as a connection on "Link 1". Connections on Link 1 make use of the known principles of CDMA with the added advantage that these connections can operate in parallel rather than sequentially, yielding a time saving advantage.

It is an advantage of the invention to make use of ultra wideband radio technology (UWB-RT) in combination with code division multiple access (CDMA), i.e. using ultra wideband radio signals modulated according to the principles of CDMA, to achieve parallel and timely measurement and collection of the total signal transfer times (TSTTs).

It is a further advantage that a signal's TSTT can be measured without need for strict distributed time synchronization among all the receivers. Moreover, the TSTT can be measured based on only a single point of synchronization and without need to know absolute time information.

With the present invention the implementation of location-aware as well as location-based applications for wireless networking systems or object-tracking wireless systems can be enabled. This can also be used for wireless systems operating in an indoor environment.

Another advantage of the present invention is that sufficient information to the processing unit at an arbitrary or a priori unknown location can be delivered, such that it can compute an estimate of the a priori unknown location of the signal source or first transmitter.

The second signals $\{\tilde{S}_n\}$ are also emitted in an independent and uncoordinated fashion according to the principles of CDMA by a set of second transmitters whose antennas may or may not be identical with the respective first receiver's antennas. The second signals $\{\tilde{S}_n\}$ are 20 received by a bank of second receivers that make use of either the same antenna or individual antennas and whose spatial location may or may not be known. A link between any second transmitter and any second receiver will hereafter be referred to as a connection on "Link 2". Connections on Link 2 make use of the known principles of CDMA with the added advantage that these connections can operate in parallel rather than sequentially, yielding a time saving advantage.

The second receiver, or possibly bank of second receivers, is connected to a common controller. The controller provides in a first step appropriate reference time indications that can be used to terminate a measurement cycle for a particular mobile radio terminal or radio tag. In a second step, the controller delivers to the processing unit a set of third signals $\{\hat{S}_n\}$ for each mobile radio terminal or radio tag that are derived from corresponding second signals $\{\tilde{S}_n\}$. The link between the controller and the processing unit will hereafter be referred to as a connection on "Link 3". The processing unit can make use of the received set of third signals $\{\hat{S}_n\}$ to estimate the spatial location of the first signal source; generally, the processor provides this location estimate for further use to other entities of the system or to a suitable application program.

It is an advantage of the present invention that the first and second receivers are able to resolve the arrival time instant of a first signal with high resolution provided that all first transmitters, all first receivers, all second transmitters, and all second receivers make use of UWB-RT. For example, U.S. Pat. No. 6,054,950 and references mention that an arrival time resolution of much better than 100 ps is achievable with UWB-RT, enabling spatial resolution on the order of centimeters. Thus the transition time of the second signal $\{\tilde{S}_n\}$ on any Link 2 can be accurately determined in advance, for example during a calibration step when the system components are installed in a particular environment. Upon detection of one first signal $\{S\}$, each of the second receivers starts a first time counter at a non-zero initial count corresponding to the scheduled relative transmission time of the derived second signal. The scheduled relative transmission time, in this document referred to as first time-count value $\delta_n$ or "Delay 1", corresponds to the time of emission of the second signal $\{\tilde{S}_n\}$ with the timing phase referred to the second transmitter's antenna feed point. In other words, the first time-count value $\delta_n$ is the total delay between transponder's receive and transmit antenna feed point. Each second transmitter prepares and schedules its second signal for transmission over Link 2 independently and each second signal $\{\tilde{S}_n\}$ includes at least i) information for unique identification of the first receiver, ii) information on the identity of the first signal source, and iii) "Delay 1." Depending on the designer's choice, the specific known location of the second receiver and/or the previously determined second signal transition time on Link 2 may also be directly included in the second signal $\{\tilde{S}_n\}$. Upon detection of a corresponding second signal $\{\tilde{S}_n\}$, each of the second receivers starts a second time counter at initial count zero, stopping it only at its final second time count when the common controller issues a corresponding stop-signal, simultaneously to all second time counters associated with a particular identified mobile radio terminal or radio tag. This single reference time event initiates the end of an active TOA or TDOA measurement cycle for a particular identified mobile radio terminal or radio tag. The controller generates for each identified mobile radio terminal or radio tag a separate single reference time event at the end of an active TOA or TDOA measurement cycle.

The controller then prepares for each second receiver an appropriate third signal $\{\hat{S}_n\}$ for transfer over Link 3, this third signal $\{\hat{S}_n\}$ including at least i) information on the identity of the first signal source, ii) information on the identity of the second receiver, iii) Delay 1, iv) the previously determined time-delay value $\tau_n$ on Link 2 that can be regarded as second signal transition time, and v) the final second time count or second time-count value $\Delta T_n$, hereafter also called "Delay 2." Alternatively, the third signal $\{\hat{S}_n\}$ may also include the specific known location of the second receiver and/or a total sum consisting of three terms, i.e., Delay 1, the previously determined time-delay value $\tau_n$ on Link 2, and Delay 2. Thus, the system yields the advantage of only requiring a single reference time to be made available in the single controller controlling the second receivers. The total time interval between the time instant of a first signal arriving at a first receiver and the time instant when the second time count is stopped is the sum of only three known individual time intervals, namely, Delay 1, transfer time on Link 2, and Delay 2. Thus, a major advantage of the present invention is given by the fact that the sought TOA or TDOA measurements can be obtained by the processing unit from computing such corresponding total time intervals or from computing differences thereof, respectively. Strict and absolute time synchronization among all the first and second receivers is not required and independent clock signal generators with certain specified frequency and stability are sufficient. The use of particularly wide channel bandwidths, e.g., as obtained when using system components based on UWB-RT, achieves precise TOA and TDOA measurements and reduced sensitivity to multi-path propagation.

The present invention provides furthermore the opportunity to determine the TOA of first signals $\{S\}$ at first receivers. This can be achieved provided that the stop-signal issued by the controller to all second time counters can be related to an absolute time reference. This could be achieved, for example, by making use of the network time reference or the time information obtained from a separate time reference receiver that is connected to the controller, such as a GPS receiver. The set of third signals $\{\hat{S}_n\}$ is transferred to the processing unit over the connection previously called Link 3, where the latter can be implemented by means of wires or by means of other transmission media. Generally, the set of third signals $\{\hat{S}_n\}$ received by the processing unit enables the latter to provide an estimate of the spatial location of the first signal source identified by the set of third signals $\{\hat{S}_n\}$.

The present invention provides a practical solution for precise and timely determination of TOA at individual receiving stations and determination of TDOA at pairs of receiving stations, where knowledge of absolute time or absolute time synchronization between system components located at different spatial positions is not required to determine a particular signal's path propagation time within specified accuracy. The system can be applied to applications that require an up-to-date and accurate estimate of the a priori unknown spatial location of the source emitting a receivable signal.

The system avoids certain disadvantages found in systems based on a "mobile-based architecture," systems using sequential synchronization of communicating stations, or systems requiring strict time synchronization among all the receivers. Rather, the proposed solution provides advantages and features such as those derivable from systems based on a "network-based architecture," communication systems using multiple-access technology (e.g., CDMA), systems without need for strict time synchronization among all receivers, systems operating with independent clock signal generators of some specified frequency and stability. All these benefits can be enhanced when the underlying communication devices make suitable use of UWB-RT.

In summary, the present invention provides the following advantages and features:

TOA and TDOA determination require only a single point of synchronization without need to know absolute time information, not restricted to "network-based architecture,"

use of multiple-access technology (e.g., CDMA) to achieve parallel and therefore timely generation and collection of determination results, no need for strict distributed time synchronization among all the receivers; independent clock signal generators with certain specified frequency and stability are sufficient, use of particularly wide channel bandwidths (as provided by UWB-RT) to achieve precise TOA and TDOA determination with reduced sensitivity to multi-path propagation.

DESCRIPTION OF THE DRAWINGS

Preferred embodiments of the invention are described in detail below, by way of example only, with reference to the following schematic drawings.

The drawings are provided for illustrative purposes only and do not necessarily represent practical examples of the present invention to scale.

DETAILED DESCRIPTION AND EMBODIMENTS OF THE INVENTION

Although the present invention is applicable to a wide variety of signal sources and applications, it will be described with an emphasis on wireless radio communication enabling localization and tracking of multiple mobile radio terminals or radio tags. While it is understood that the present invention does not depend on one specific signaling or modulation method, it will be described with a preference for systems based on ultra wideband radio technology (UWB-RT). In particular, embodiments of the present invention are preferably based on UWB-RT in combination with a multiple-access technology that uses the principles of CDMA.

Figure 1:
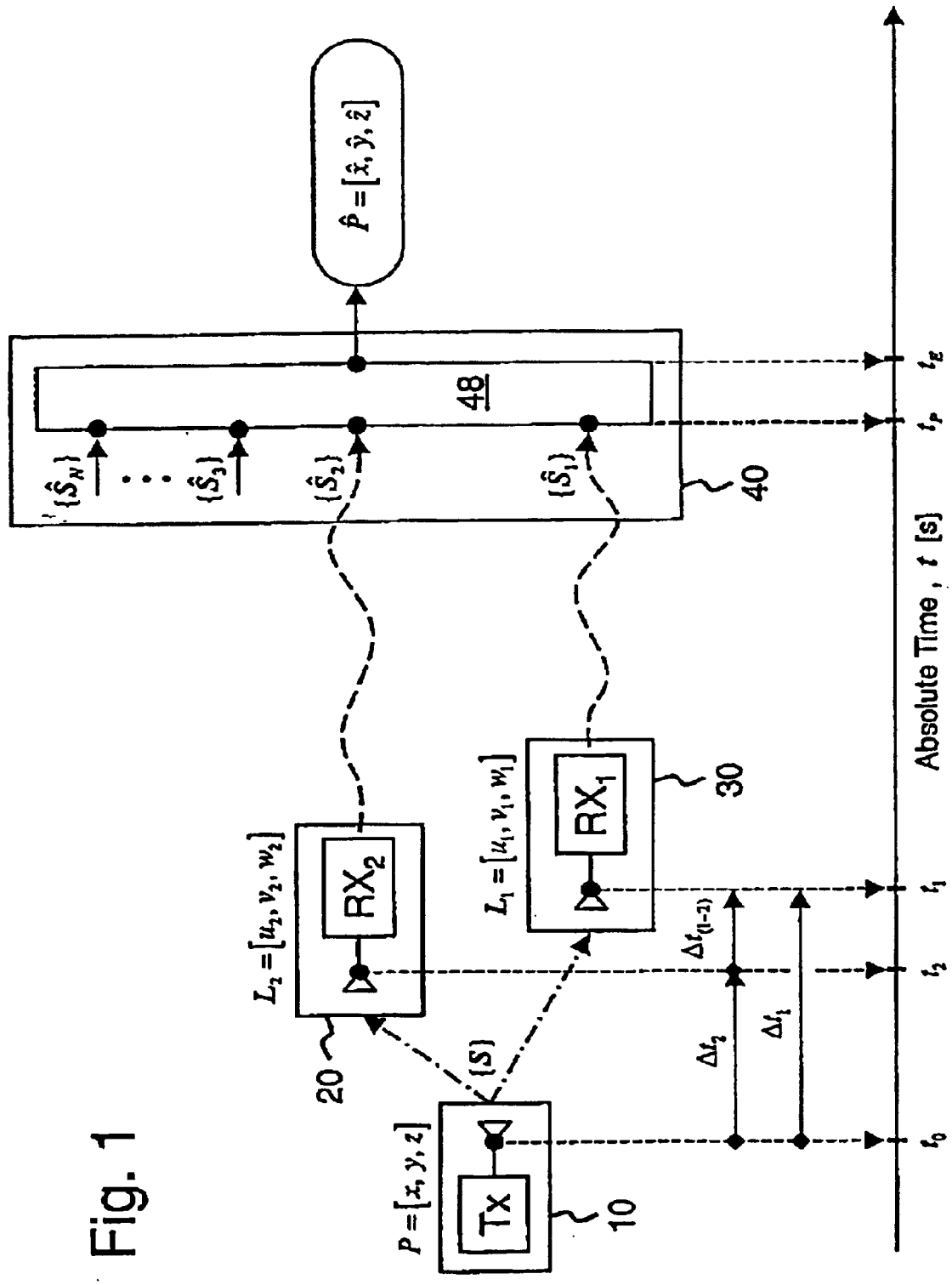
FIG. 1 shows a general illustration of a system according to the present invention, including a first transmitter with antenna feed point positioned at a priori unknown location P while emitting a signal $\{S\}$.

FIG. 1 shows a first transmitter 10, two transponder units 20, 30, respectively, and an evaluation unit 40 with a processing unit 48 receiving an ensemble of derived signals $\{\hat{S}_n\}$, with n=1, 2, ..., N, also referred to as third signals $\{\hat{S}_n\}$, which relate to a transmitted or emitted signal $\{S\}$, also referred to as first signal $\{S\}$, and taken together provide sufficient information to compute, $\hat{P}$ an estimate of the a priori unknown location P of the first transmitter 10.

In detail, the first transmitter 10 with antenna feed point positioned at a priori unknown location P=[x, y, z] emits the first signal $\{S\}$ at unknown time instant $t_0$. The two transponder units 20, 30 receive the transmitted or emitted signal $\{S\}$ by means of respective antennas with feed points located at the a priori known locations $L_1=[u_1, v_1, w_1]$ and $L_2=[u_2, v_2, w_2]$, at time $t_1$ and $t_2$, respectively. It is understood that the signal propagation times $\Delta t_1 = t_1 - t_0$ and $\Delta t_2 = t_2 - t_0$ both correspond to the direct line-of-sight signal path, also abbreviated to LOS signal path hereinafter. Without ever knowing the absolute time instants $t_0$, $t_1$, and $t_2$, it is possible to determine the difference in the propagation times, $\Delta t_{(1-2)} = \Delta t_1 - \Delta t_2$, which is also the previously defined TDOA, since $\Delta t_{(1-2)} = t_1 - t_2$, as can be seen from FIG. 1. It thus follows that the sought TDOA is given as $$\Delta t_{(1-2)} = t_1 - t_2 = (t_1 - t_0) - (t_2 - t_0) = \Delta t_1 - \Delta t_2.$$

Information is provided to the processing unit 48 at a processing time $t_P$, in the form of an ensemble of the derived third signals $\{\hat{S}_n\}$, with n=1, 2, ..., N, which relate to the transmitted signal $\{S\}$, providing sufficient information to compute $\hat{P}=[\hat{x}, \hat{y}, \hat{z}]$ at an evaluation time $t_E$, an estimate of the a priori unknown location P=[x, y, z] of the first signal source or first transmitter 10.

The same reference numbers and signs are used to denote the same or like parts.

Figure 2:
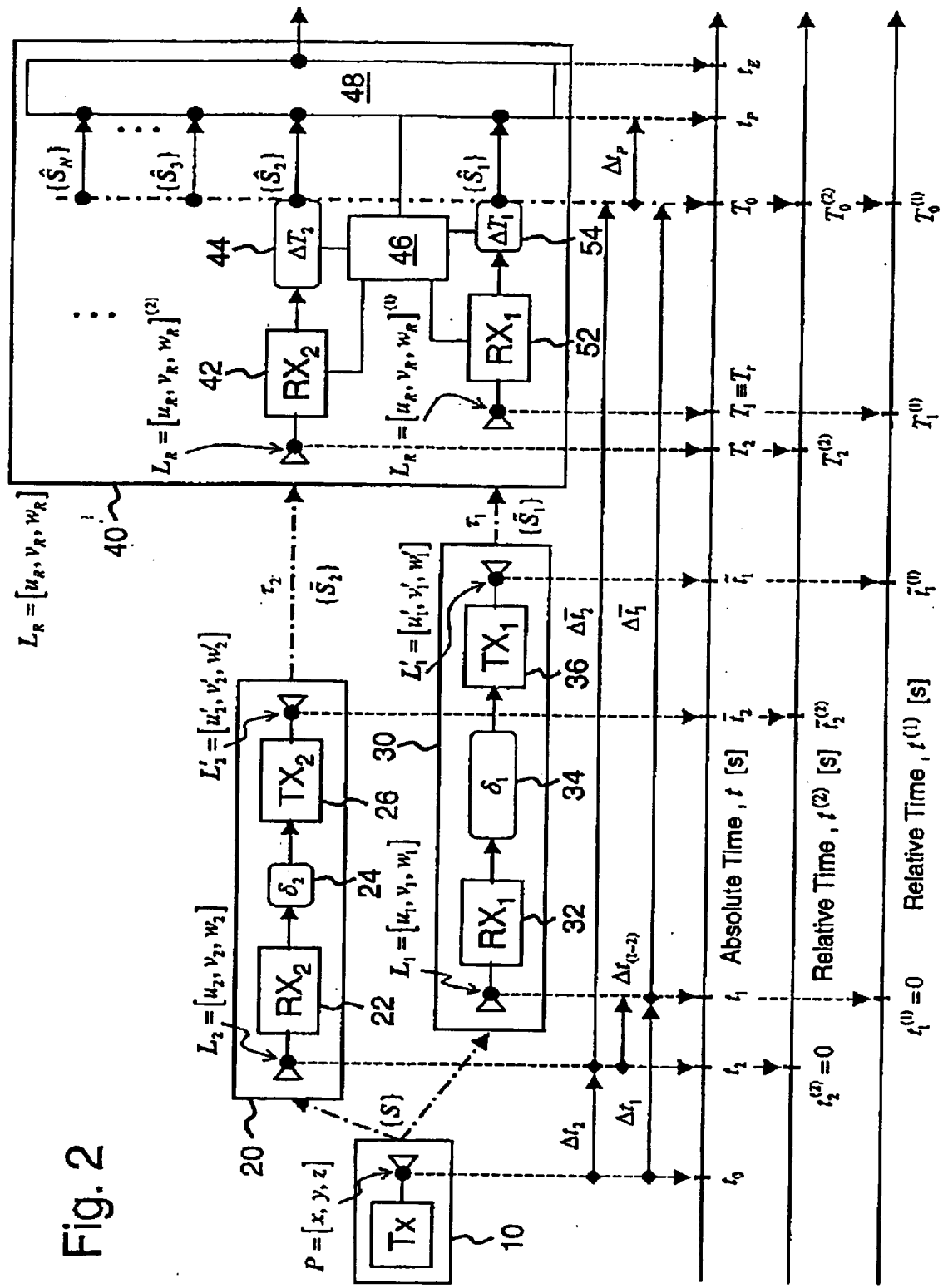
FIG. 2 shows a more detailed illustration of FIG. 1, including the first transmitter with antenna feed point positioned at the a priori unknown location P and emitting a signal $\{S\}$.

FIG. 2 shows a more detailed illustration of FIG. 1, including the first transmitter 10 with one antenna feed point positioned at the a priori unknown location P and emitting the signal $\{S\}$, the two transponder units 20, 30, respectively, and the evaluation unit 40. Each transponder unit 20, 30 comprises a first receiver 22, 32, a time-processing unit 24, 34, and a second transmitter 26, 36, respectively, which in order are connected. The evaluation unit 40 comprises a controller 46 and for each signal path a second receiver 42, 52 and a timer unit 44, 54 that is coupled to the second receiver 42, 52. The controller 46 controls each timer unit 44, 54 and is connected to each second receiver 42, 52 and the processing unit 48.

The two first receivers 22, 32 receive the transmitted signal $\{S\}$ by means of respective antennas with feed points located at known locations $L_1$ and $L_2$, respectively. Each second transmitter 26, 36 emits a time-processed signal $\{\tilde{S}_1\}, \{\tilde{S}_2\}$, which is referred to as second signal $\{\tilde{S}_1\}, \{\tilde{S}_2\}$, after a known respective time interval $\delta_1$, $\delta_2$, which is also called first time-count value $\delta_1$, $\delta_2$, or Delay 1. The first time-count value $\delta_1$, $\delta_2$ is measured as the time difference between the time when the first signal $\{S\}$ passes at the feed point of the respective first receiving antenna ($t_1$ and $t_2$, respectively) and the second signal $\{\tilde{S}_1\}$, $\{\tilde{S}_2\}$ passes at the feed point of the respective second transmitting antenna ($\tilde{t}_1$ and $\tilde{t}_2$, respectively) located at locations $L'_1$ and $L'_2$, respectively, where generally $L'_1 \neq L_1$, and $L'_2 \neq L_2$. Consequently, each second receiver 42, 52 receives the respective second signal $\{\tilde{S}_1\}, \{\tilde{S}_2\}$ after a known respective time interval $\tau_1$, $\tau_2$, which is also called determinable time-delay value $\tau_1$, $\tau_2$, or Delay 2. Each determinable time-delay value $\tau_1$, $\tau_2$ is determined as the time difference between the time when the second signal $\{\tilde{S}_1\}, \{\tilde{S}_2\}$ passes at the feed point of the respective second transmitting antenna ($\tilde{t}_1$ and $\tilde{t}_2$, respectively) and the second signal $\{\tilde{S}_1\}$, $\{\tilde{S}_2\}$ passes at the feed point of the respective second receiving antenna ($T_1$ and $T_2$, respectively), positioned at a location $L_R=[u_R, v_R, w_R]$. Finally, the processing unit 48 receives an ensemble of third signals $\{\hat{S}_n\}$, with n=1, 2, ..., N, after a known respective delay time $\Delta T_1$, $\Delta T_2$, which is also called second time-count value $\Delta T_1$, $\Delta T_2$, or Delay 3. The second time-count value $\Delta T_1$, $\Delta T_2$ is measured as the time difference between the time when the second signal $\{\tilde{S}_1\}, \{\tilde{S}_2\}$ passes the feed point of the respective second receiving antenna ($T_1$ and $T_2$, respectively) and the time reference $T_0$ issued by the controller 46. The time reference $T_0$ for each timer unit 44, 54 is therefore generated by the controller 46. Taken together, i.e. the first time-count value $\delta_n$, the time-delay value $\tau_n$, and the second time-count value $\Delta T_n$ provide sufficient information to compute a time of arrival $t_n$ and derive therefrom $\hat{P}$, an estimate of the a priori unknown location P.

FIG. 2 also indicates that for each signal path the absolute time scale can be replaced by an individual relative time scale where zero in relative time is identical with the first signal's respective arrival time at the feed point of the first receiver's antenna ($t_1 \rightarrow t_1^{(1)}=0$ and $t_2 \rightarrow t_2^{(2)}=0$, respectively). Similarly, other relevant absolute times can be replaced by individual relative time values. Thus, the following relations can be directly derived:

$$T_0 - t_0 = \Delta t_1 + \Delta \bar{t}_1 \Rightarrow \Delta t_1 = (T_0 - t_0) - \Delta \bar{t}_1$$

$$T_0 - t_0 = \Delta t_2 + \Delta \bar{t}_2 \Rightarrow \Delta t_2 = (T_0 - t_0) - \Delta \bar{t}_2$$

$$\Delta \bar{t}_1 = T_0 - t_1 = T_0^{(1)}$$

$$\Delta \bar{t}_2 = T_0 - t_2 = T_0^{(2)}$$

Therefore, it follows that the sought TDOA can be written in terms of relative times in the following form (see also FIG. 2):

$$\begin{aligned}\Delta t_{(1-2)} &= t_1 - t_2 = \Delta \bar{t}_2 - \Delta \bar{t}_1 \\ &= (T_0 - t_2) - (T_0 - t_1) = T_0^{(2)} - T_0^{(1)}\end{aligned}$$

where each of $T_0^{(1)}$ and $T_0^{(2)}$ represents the sought total signal transfer time (TSTT) of the respective signal path. It is a specific property that the TSTT can be derived as the sum of the three measurable time intervals introduced above and indicated in FIG. 2; in particular, the TSTT can be computed from:

$$T_0^{(1)} = \Delta \tilde{t}_1 = \delta_1 + \tau_1 + \Delta T_1,$$
$$T_0^{(2)} = \Delta \tilde{t}_2 = \delta_2 + \tau_2 + \Delta T_2.$$

In this example, the above equations apply to one particular pair of signal paths, identified by indices 1 and 2 and each passing through a respective transponder unit 20,30, over a respective radio connection between second transmitter 26, 36 and second receiver 42, 52. It is understood, however, that these equations are directly applicable to a plurality of such signal paths, for example, as indicated in FIG. 2 where the processing unit 48 can receive third signals $\{\hat{S}_n\}$ over N such signal paths. It is further understood that the above equations are associated with some particular first signal source, for example, the first signal source identified by index m; in the above equations, the index m has been suppressed only for reasons of simplicity.

There is no need for distributed time synchronization among all the receivers. This is achieved by the introduction of the single time reference $T_0$ issued by the common controller 46 attached to second receivers 42, 52; the following will illustrate the order of stability required from the independent clock generators used by such a system. Let $\epsilon = \Delta f/f_c$ be the relative frequency error of the various clock sources having nominal frequency $f_c$ that drive the time measuring components of the system. One true time period of this type of timing source can be approximated by the expression $$T_1 = T_c/(1+\epsilon) \approx T_c(1-\epsilon)$$

for $\epsilon \ll 1$ and $T_c = 1/f_c$. Thus, any true "Delay 1" value $\delta$ measured by such an erroneous timing source will approximately yield the measured value $$\delta' \approx \delta(1-\epsilon) = \delta - (\epsilon\delta)$$

similarly, a timing error results for "Delay 3" values:

$$\Delta T' \approx \Delta T(1-\epsilon) = \Delta T - (\epsilon \Delta T).$$

For example, assuming a timer source with relative frequency error $\epsilon = 10^{-5}$ (equivalent to 10 parts per million, usually abbreviated to 10 ppm), $\delta = \Delta T = 10$ $\mu$s, and $\tau = (100 \pm 0.1)$ns (equivalent to a free space path length of 30 meters), a total worst-case timing error of $$E_t \approx [|\epsilon|(\delta + \Delta T) + 10^{-10}] = 3 \times 10^{-10}$$

seconds, or equivalently 0.3 ns, results. This calculation assumes that the corresponding receiver clocks have been properly aligned with the phase of the received signals $\{S\}$ and, $\{\tilde{S}_n\}$, respectively. For a radio signal propagating in free space, this timing error implies a spatial uncertainty of about 10 centimeters.

The determination of an actual or absolute time of arrival (TOA) at one location or several locations, of a signal transmitted from an a priori unknown location at an arbitrary time, can be achieved if the controller 46 or processing unit 48 has means to access true absolute time information and this time information can be associated with the time instant whenever the controller 46 issues the single reference time events, $T_0$. To distinguish such a special situation, rename $$T_0 \rightarrow T_0^*.$$

where the asterisk implies known absolute time. Then, for example, the actual TOA of a first signal $\{S\}$ at the antenna feed point $L_n$ of the n-th first receiver 22, 32 would be obtained from $$t_n = T_0^* - T_0^{(n)}.$$

A connecting link between the first transmitter 10 and any first receiver 22, 32 will hereafter be referred to as a connection on "Link 1". Similarly, a link between any second transmitter 26, 36 and any second receiver 42, 52 will hereafter be referred to as a connection on "Link 2". The link between each timer unit 44, 54 controlled by the controller 46 and the processing unit 48 will hereafter be referred to as a connection on "Link 3". It is a particular property that the first signals $\{S\}$ and second signals $\{\tilde{S}\}$ are preferably all emitted in an independent and uncoordinated fashion according to the principles similar to those known from code division multiple access systems, herein above also abbreviated to CDMA systems. However, the present invention also allows for embodiments where first signals $\{S\}$ and second signals $\{\tilde{S}\}$ are transmitted in a more coordinated fashion according to some other medium access protocol.

Figure 3:
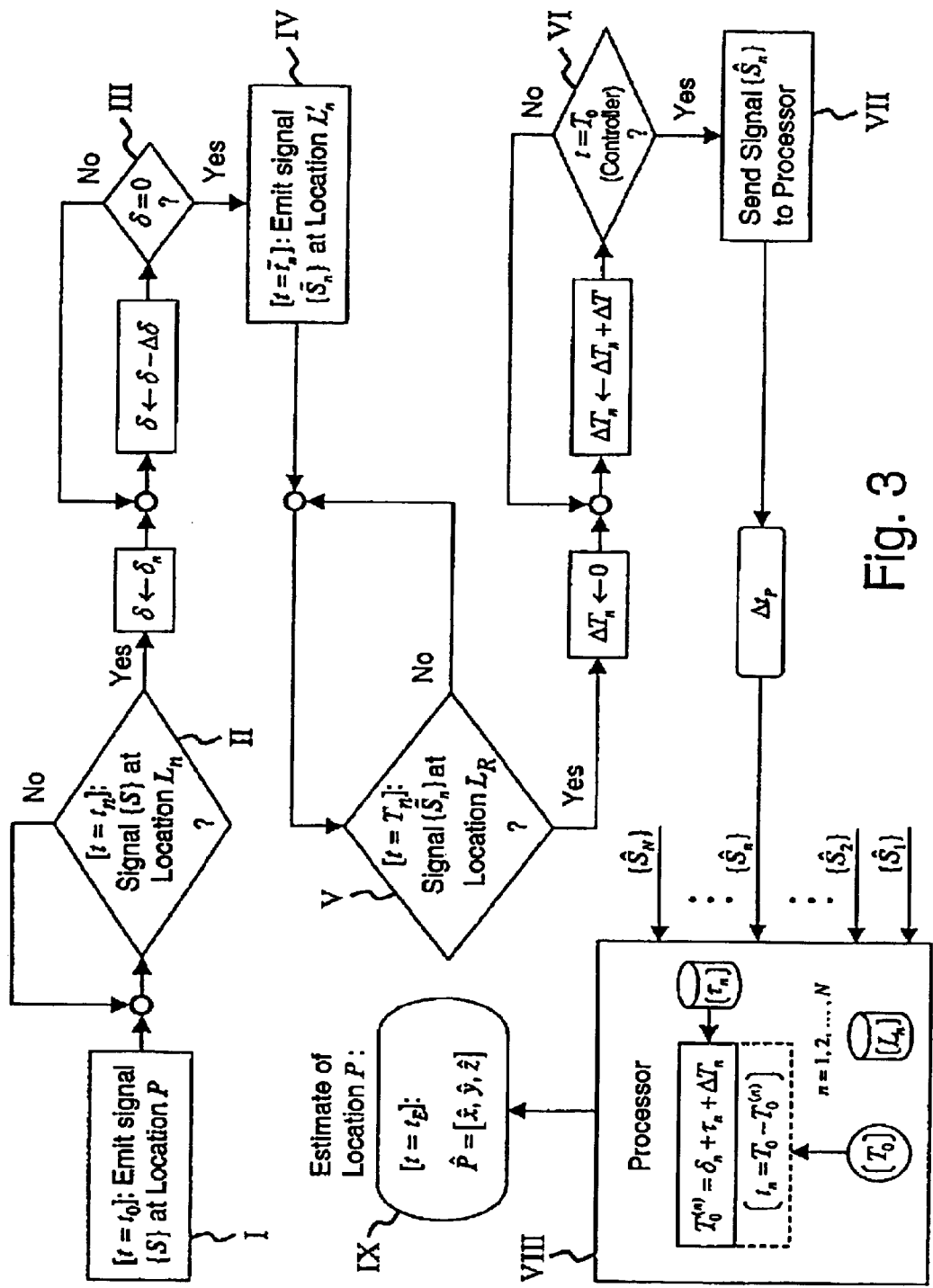
FIG. 3 shows a flow diagram for the procedure used to measure the total signal transfer time (TSTT) of signals.

FIG. 3 shows a logic diagram for the procedure used to determine TOA or TDOA measurements with reference to the parts shown in FIG. 2. The procedure including the following steps as labeled with roman numbers are:

I.) the first transmitter 10 emitting a first signal $\{S\}$ at an unknown time $t_0$ and an unknown location P;

II.) if one first signal $\{S\}$ arrives at the first receiver 22, 32 positioned at location $L_n$ at time $t=t_n$; then, initiate the time-processing unit 24, 34 with the first time-count value $\delta_n$ of transponder unit 20, 30 by a scheduled transmission delay interval and continue reducing timer value with suitable time decrement $\Delta\delta$; otherwise, the first receiver 22,32 continues waiting for arrival of one first signal $\{S\}$;

III., IV) if the first time-count value $\delta$ is identical to zero; then, the corresponding second transmitter 26, 36 emits the prepared second signal $\{\tilde{S}\}$ at usually known location $L'_n$ at time $t=\tilde{t}_n$; otherwise, continue to decrement the first time-count value $\delta$;

V.) if the second signal $\{\tilde{S}\}$ arrives at the second receiver 42, 52 positioned at usually known location $L_R$ at time $t=T_n$; then, initiate the timer unit 44, 54 with the second time-count value $\Delta T_n$ to identical zero and continue incrementing the second time-count value $\Delta T_n$ with suitable time increment $\Delta T$; otherwise, the second receiver 42,52 continues waiting for arrival of one second signal $\{\tilde{S}\}$;

VI., VII) if the controller 46 issues indication of the time reference $T_0$; then, a third transmitter coupled to the controller 46 prepares and emits the third signal $\{\hat{S}_n\}$ to the processing unit 48 (processor); otherwise, continue to increment the second timer-count value $\Delta T_n$;

VIII.) the processing unit 48 receives a set of third signals $\{\hat{S}_n | n=1, 2, \ldots, N\}$ and then computes signal path transition times $\{T_0^{(n)} | n=1, 2, \ldots, N\}$, and estimates possibly absolute signal time of arrival time $t_n$;

IX.) the processing unit 48 computes and outputs estimate $\hat{P}$ of location P at time $t=t_E$.

Figures 4, 5:
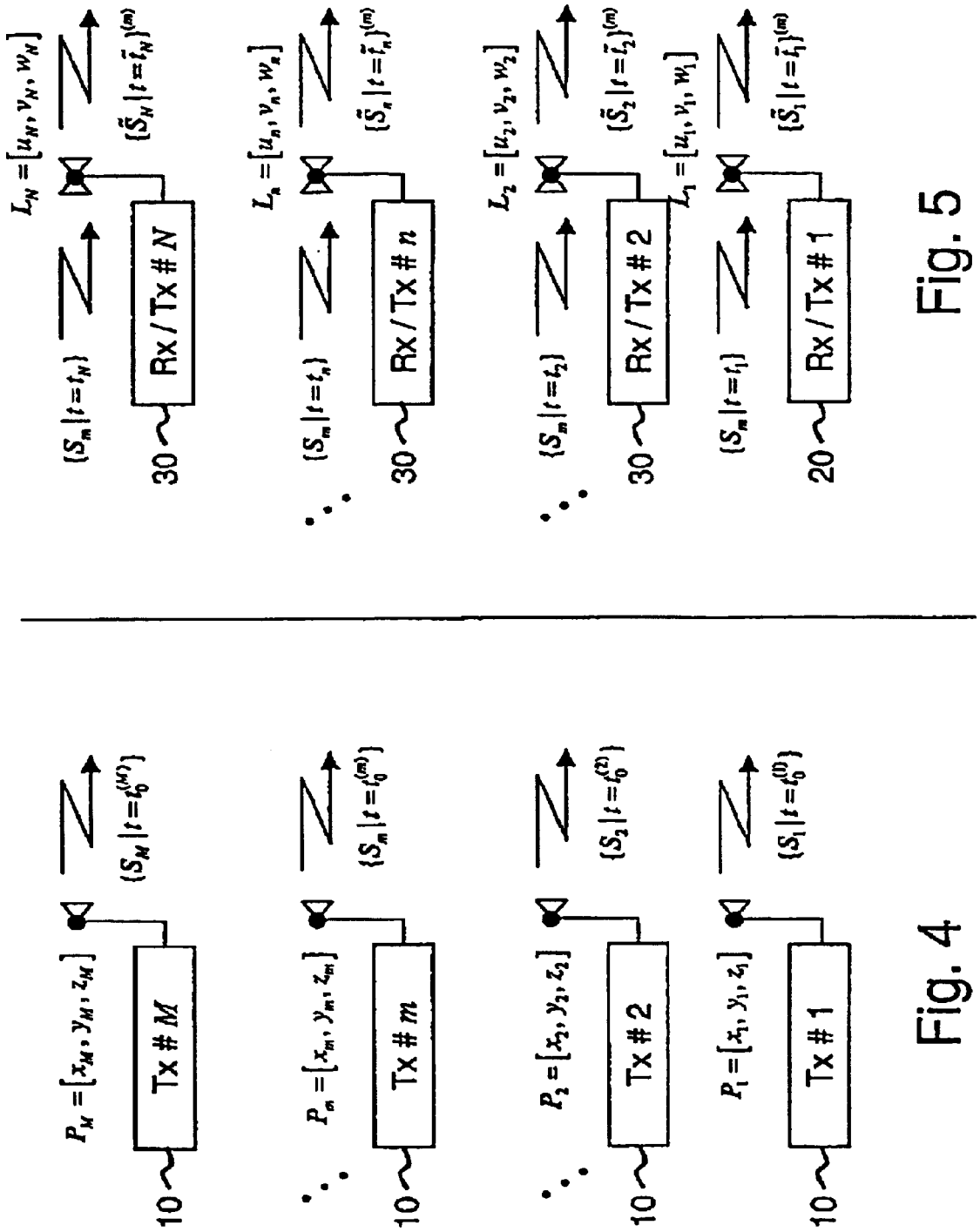
FIG. 4 shows an assembly of mobile transmitters, herein also called first transmitters and identifiable by the index m=1, 2, . . . , M, where the m-th first transmitter feeds a signal $\{S_m\}$ at time $t_0^{(m)}$ to the respective antenna feed point positioned at the a priori unknown spatial location $P_m$.
FIG. 5 shows an assembly of transponder units, also called transceivers, identifiable by the index n=1, 2, . . . , N, and positioned at different spatial locations $L_n$, where the n-th transceiver includes a first receiver receiving a signal $\{S_m\}$ at a priori unknown time $t_n$ at its receiving antenna feed point positioned at known location $L_n$, and a second transmitter feeding the derived signal $\{\tilde{S}_n\}^{(m)}$ to the same known transmitting antenna feed point at a later time $\tilde{t}_n$.

It is understood that any embodiment may include more than one first transmitter 10. For example, FIG. 4 shows an assembly of mobile transmitters 10, herein before also called first transmitters 10, that are identifiable by the index m=1, 2, ..., M, where the m-th first transmitter 10 feeds a signal $\{S_m\}$ at time $t_0^{(m)}$ to the respective antenna feed point positioned at the a priori unknown spatial location $P_m = [x_m, y_m, z_m]$.

Reference for measurement are antenna feed points; it is understood that any other convenient reference points in the system may be defined.

It is further understood that any embodiment may include more than two transponder units 20, 30, also referred to as transceivers 20, 30. For example, FIG. 5 shows an assembly of N transceivers 20, 30 identifiable by the index n=1, 2, ..., N, that are positioned at different spatial locations $L_n=[u_n, v_n, w_n]$. Here, the n-th transceiver 20, 30 includes a first receiver receiving signal $\{S_m\}$ from the m-th first transmitter 10 at a priori unknown time $t_n$ with the latter referred to the receiving antenna's feed point positioned at known location $L_n$. Then, the second transmitter 26, 36 feeds the derived second signal $\{\tilde{S}_n\}^{(m)}$ to the same known transmitting antenna feed point at a later scheduled time $\tilde{t}_n$. The antenna arrangement shown in FIG. 5 is a preferred arrangement; generally, a different arrangement may be used where the receiving and transmitting antennas of the transceiver 20, 30 are positioned at different locations.

Figure 6A:
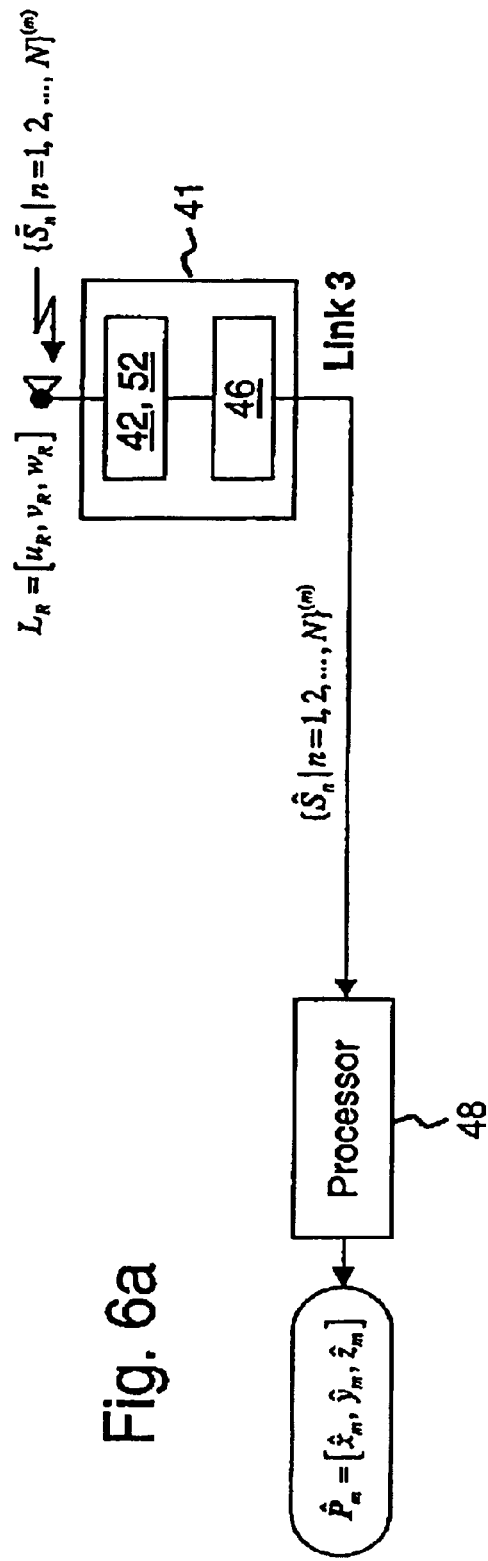
FIG. 6a shows a pre-evaluation unit that receives a set of signals $\{\tilde{S}_n|n=1, 2, \ldots, N\}^{(m)}$ at the antenna feed point positioned at location $L_R$ and that is connected to a processing unit receiving the derived set of signals $\{\hat{S}_n|n=1, 2, \ldots, N\}^{(m)}$ from the output of the pre-evaluation unit, either over an electrical cable or an optical fiber, for computation of a location estimate $\hat{P}_m$.
Figure 6B:
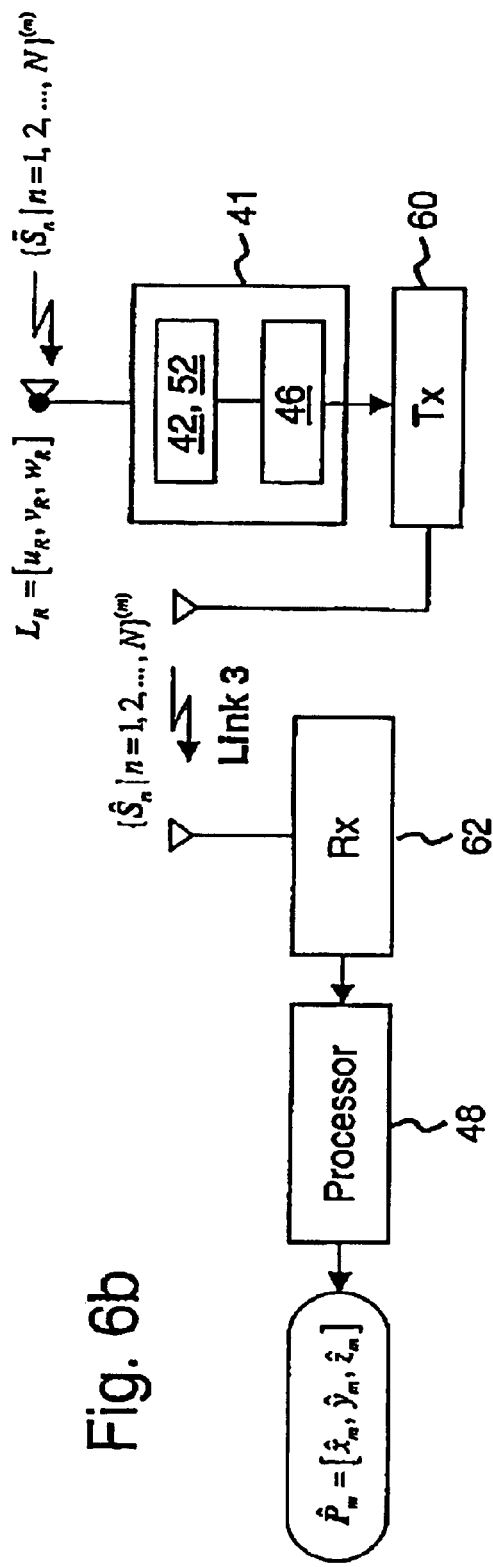
FIG. 6b shows the pre-evaluation unit which receives signals $\{\tilde{S}_n|n=1, 2, \ldots, N\}^{(m)}$ at the antenna positioned at location $L_R$, the output of the pre-evaluation unit being connected to the input of a third transmitter that transmits over a radio link a set of signals $\{\hat{S}_n|n=1, 2, \ldots N\}^{(m)}$ to a second receiver that attaches by a wire connection to the processing unit computing a location estimate, $\hat{P}_m$.

Different arrangements are possible for implementing Link 3, that is connections between second receivers 42, 52 with associated controller 46 and the processing unit 48. FIG. 6a shows a pre-evaluation unit 41 comprising the second receiver 42, 52 and the controller 46 which receives a set of second signals $\{\tilde{S}_n | n=1, 2, ..., N\}^{(m)}$ at the antenna feed point positioned at usually known location $L_R=[u_R, v_R, w_R]$, whose controller 46 is connected to the processing unit 48, receiving the derived set of third signals $\{\hat{S}_n | n=1, 2, ..., N\}^{(m)}$ for computing a location estimate, $\hat{P}_m$. The output of the controller 46 and input of the processing unit 48 can be connected by a cable, for example, an electrical cable or an optical fiber cable. Similarly, FIG. 6b shows the pre-evaluation unit 41 comprising the second receiver 42, 52, the controller 46, and one third transmitter 60. The pre-evaluation unit 41 receives second signals $\{\tilde{S}_n | n=1, 2, ..., N\}^{(m)}$ at the antenna feed point positioned at known location $L_R=[u_R, v_R, w_R]$. Here, the output of the controller 46 is connected to the input of the third transmitter 60 that transmits over a radio link a set of third signals $\{\hat{S}_n | n=1, 2, ..., N\}^{(m)}$ to a third receiver 62 attached by a wired connection to the processing unit 48 computing a location estimate, $\hat{P}_m$.

Figure 7A:
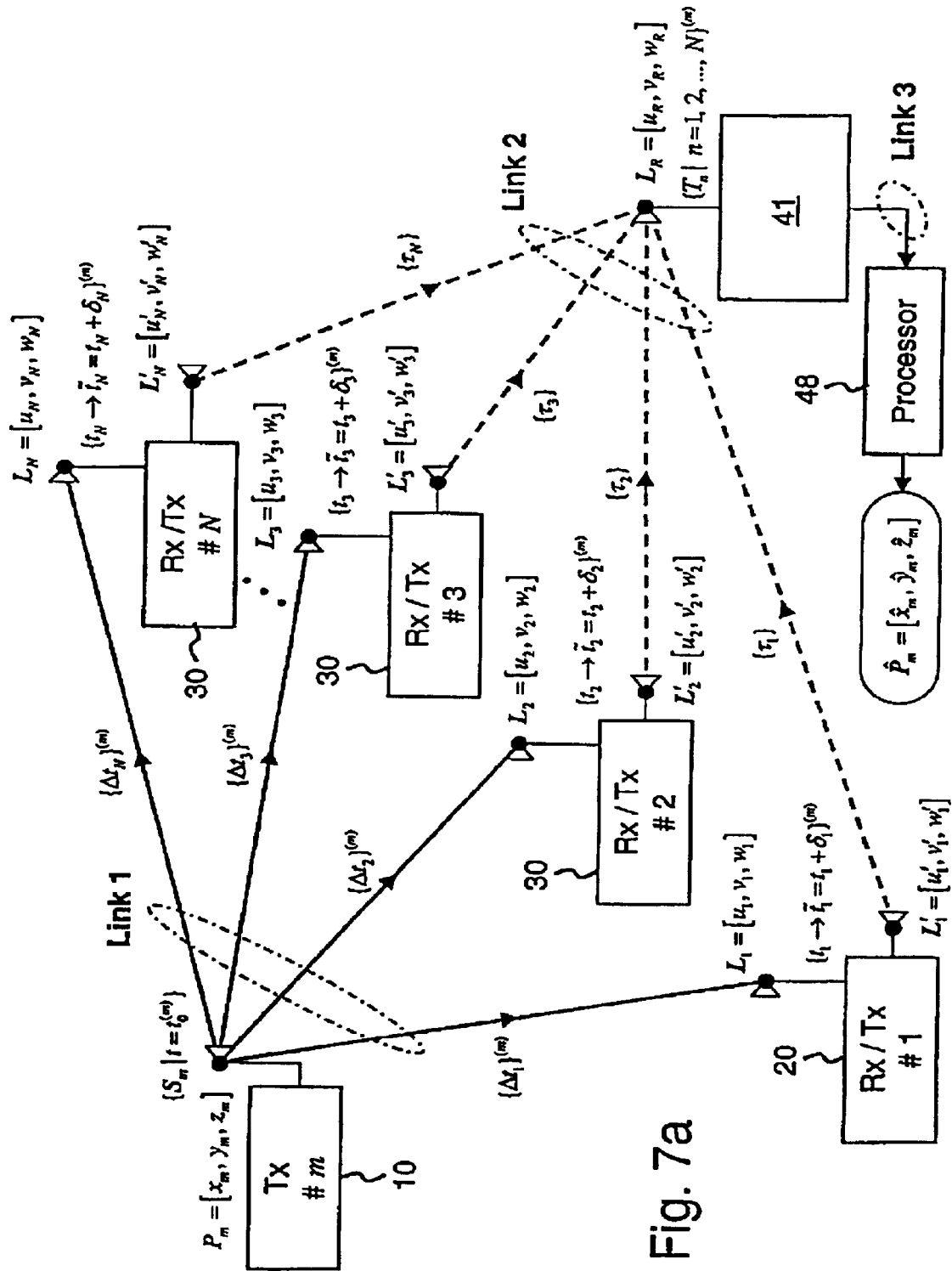
FIG. 7a shows a first version of a first embodiment of a system for determining a time of arrival $t_n$ of a radio signal receivable at different locations of known spatial coordinates.

FIG. 7a shows a first version of a first embodiment of a system for determining TOA or TDOA of a radio signal receivable at different locations of known spatial coordinates where each transponder unit 20, 30 uses separate receiving and transmitting antennas. The pre-evaluation unit 41, comprising the second receiver 42, 52, the timer unit 44, 54, and the controller 46, is connected via Link 3 to the processing unit 48. The Link 3 can be any connection known in the art.

Figure 7B:
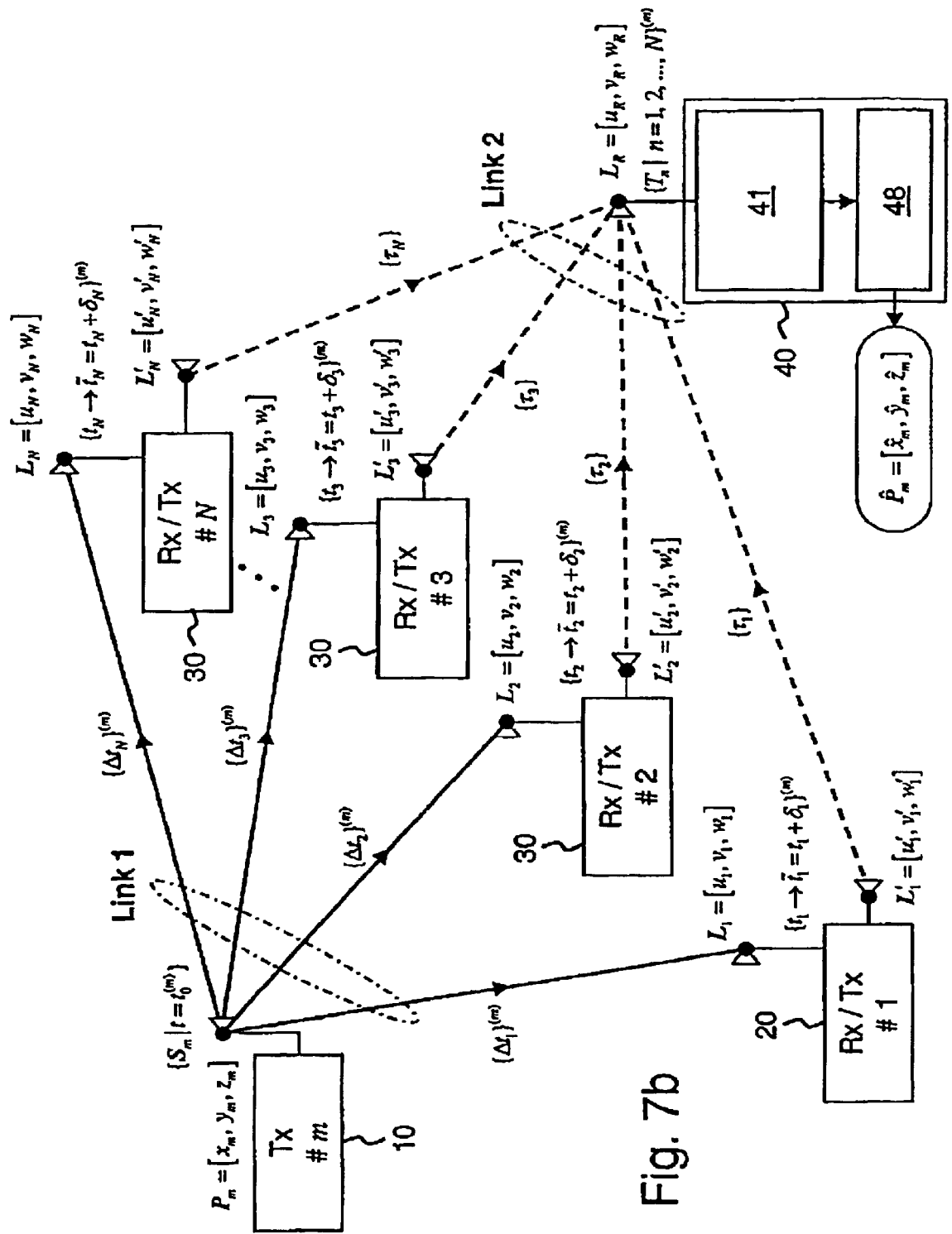
FIG. 7b shows a second version of the first embodiment.

FIG. 7b shows a second version of the first embodiment. The system in FIG. 7b differs from the system in FIG. 7a in that the processing unit 48 is directly attached to the pre-evaluation unit 41 within the evaluation unit 40.

Figure 8:
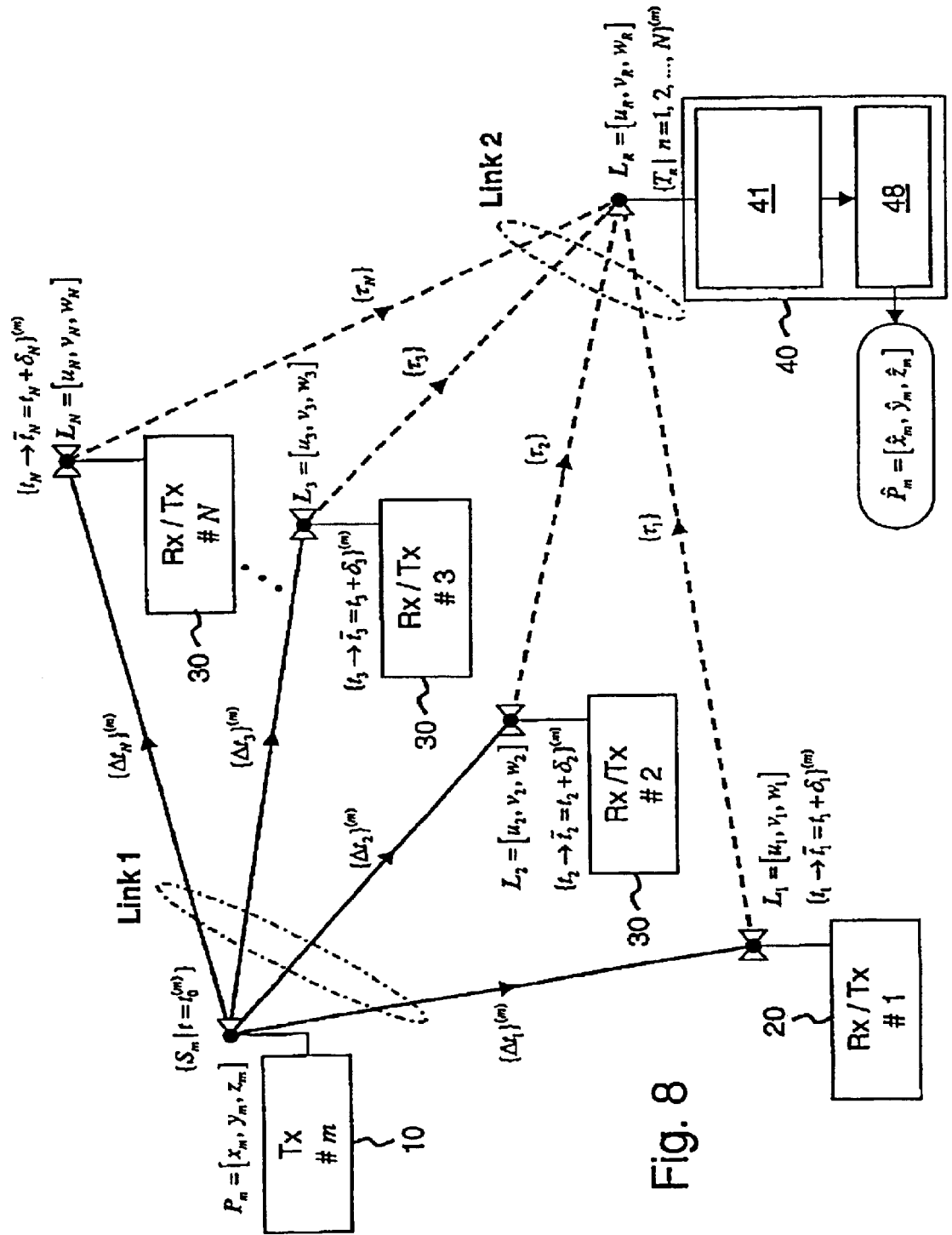
FIG. 8 shows a modified first embodiment.

FIG. 8 shows a further modified first embodiment. This embodiment differs from the system shown in FIG. 7b in that the transponder unit 20, 30 uses one antenna for reception as well as transmission.

Figure 9:
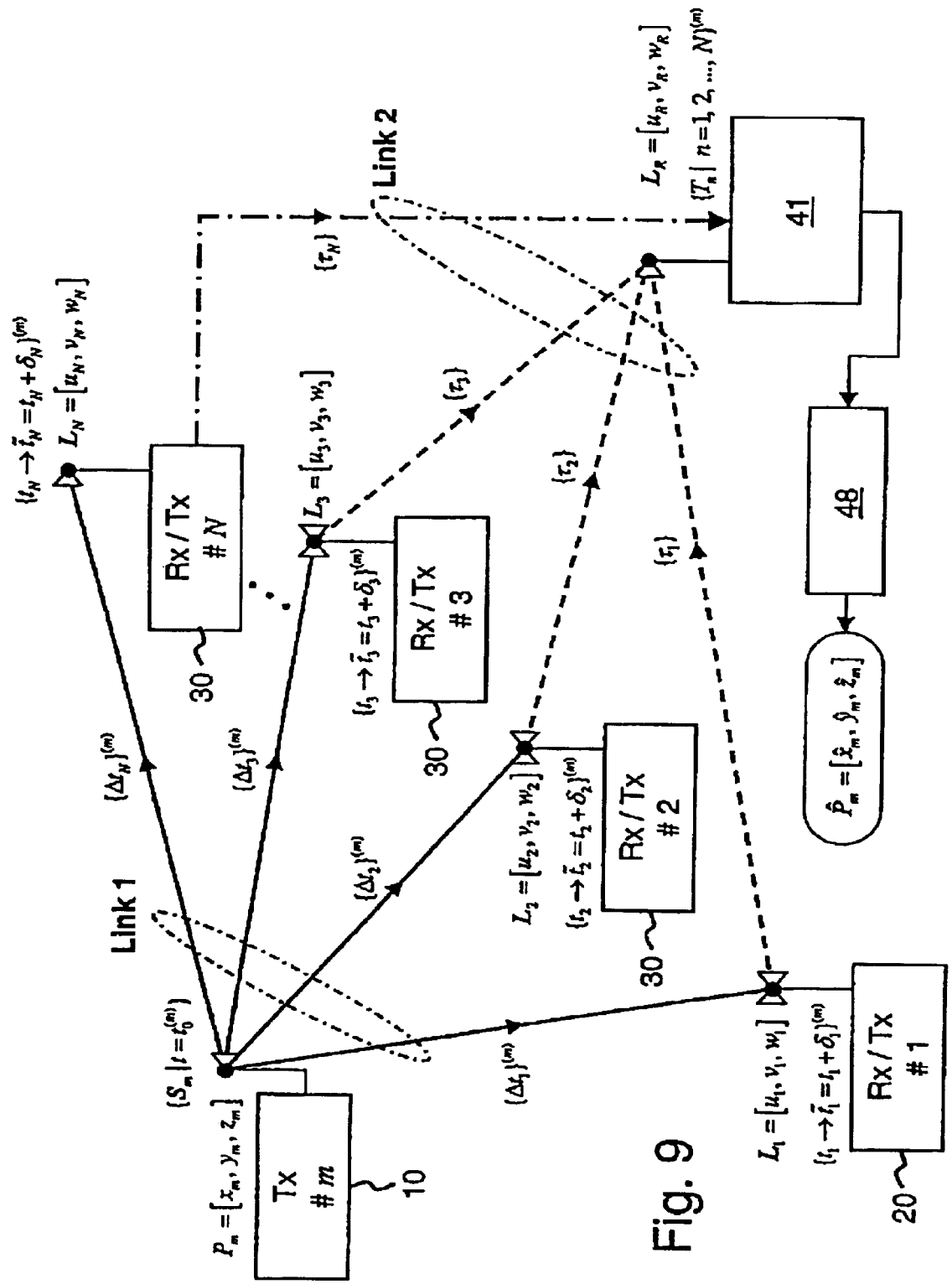
FIG. 9 shows a second embodiment.

FIGS. 9 to 12 show further possible embodiments. In particular, FIG. 9 shows an embodiment, for example, where the Link 2 between the transponder unit 20, 30 and the pre-evaluation unit 41 is either a radio connection or a cable connection, where the cable enables electrical or optical signaling.

Figure 10:
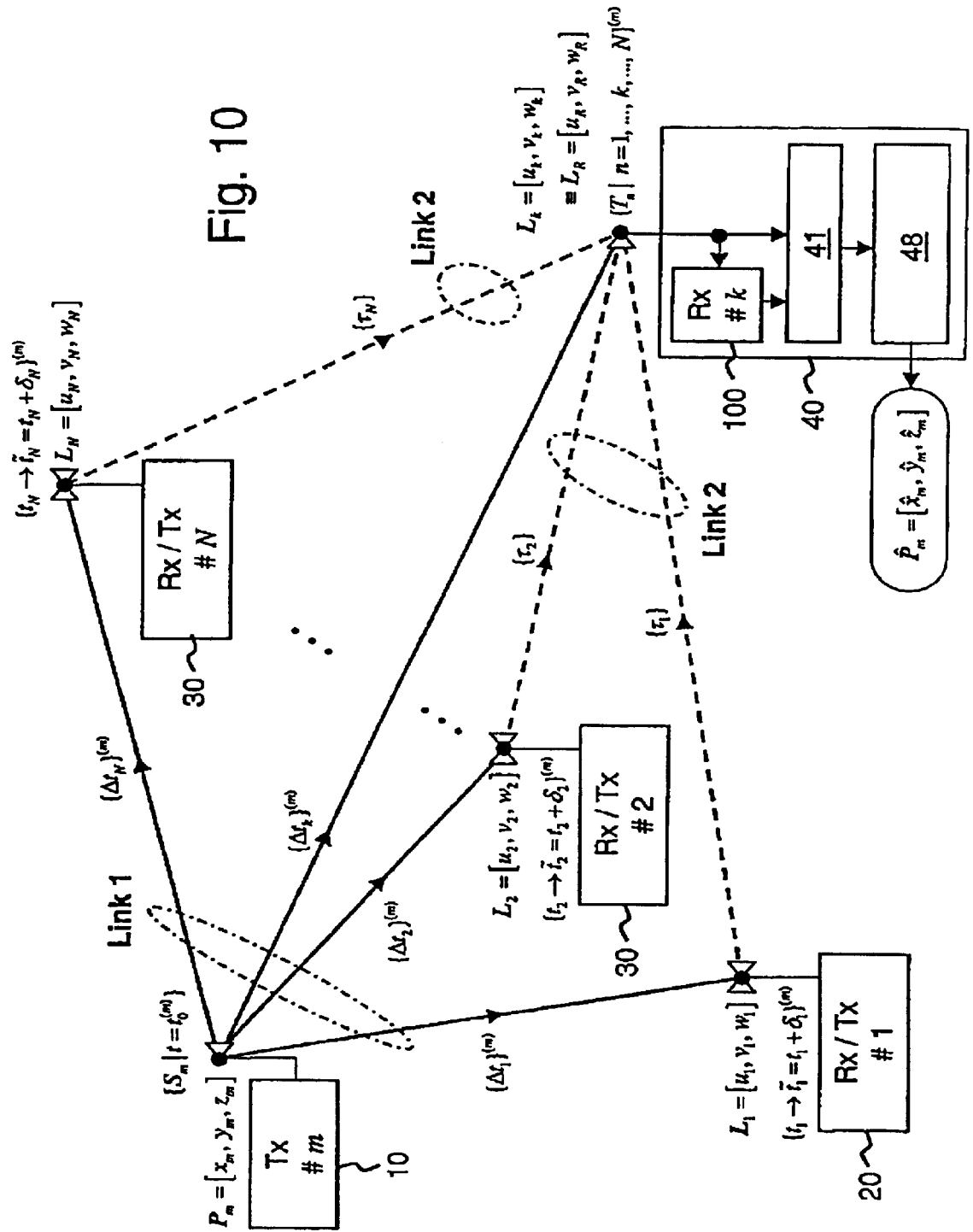
FIG. 10 shows a third embodiment.

FIG. 10 shows, for example, that the functions of the k-th first receiver can also be combined in a receive unit 100, that is directly connected to the pre-evaluation unit 41, meaning the k-th signal path does not include an active Link 2.

Figure 11:
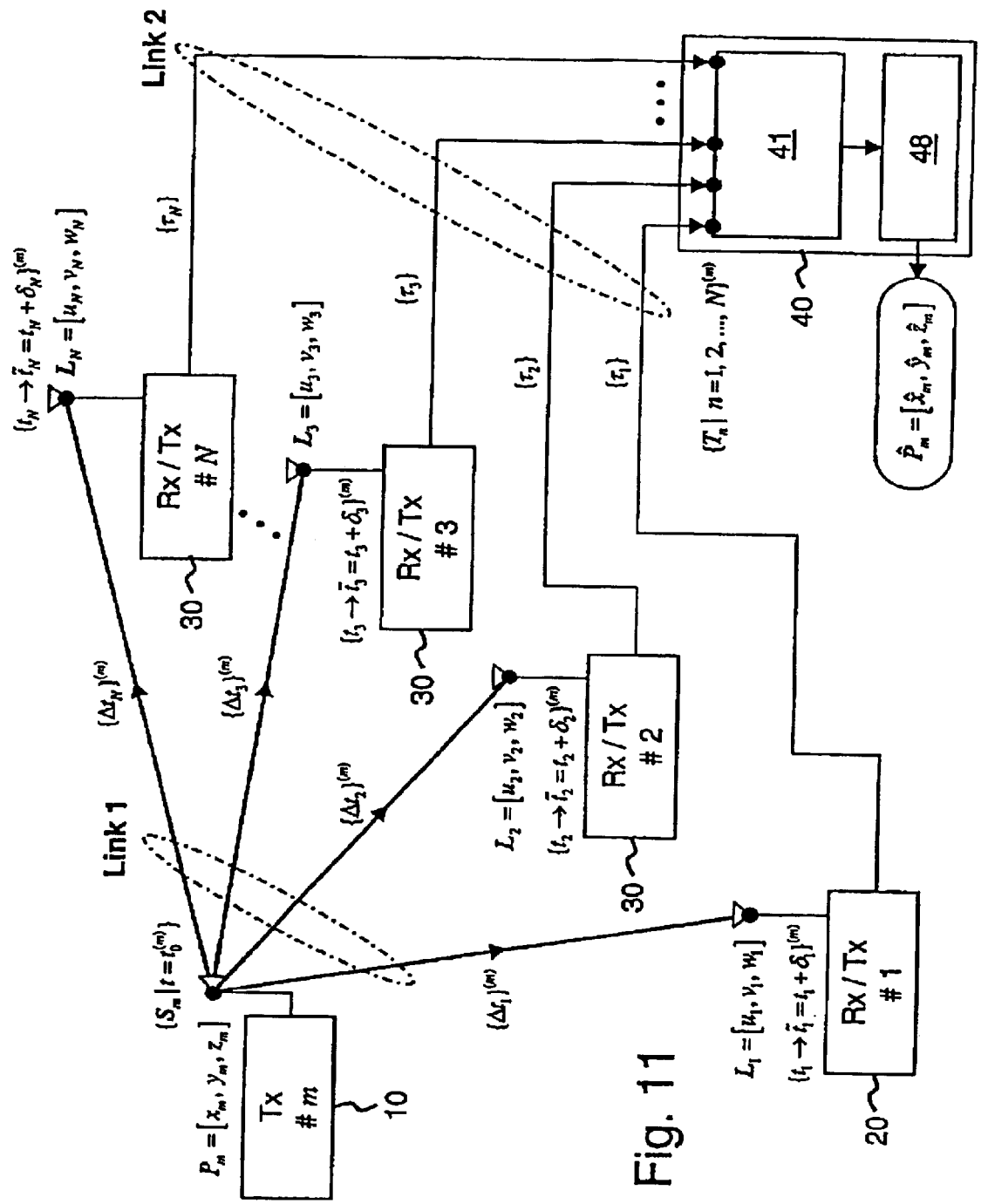
FIG. 11 shows a fourth embodiment.

FIG. 11 shows that all Links 2 can be replaced with wired connections, in particular, wired connections carrying electrical or optical signals. The propagation times over such connections can be determined accurately at installation time of the system by using known appropriate calibration procedures.

Figure 12:
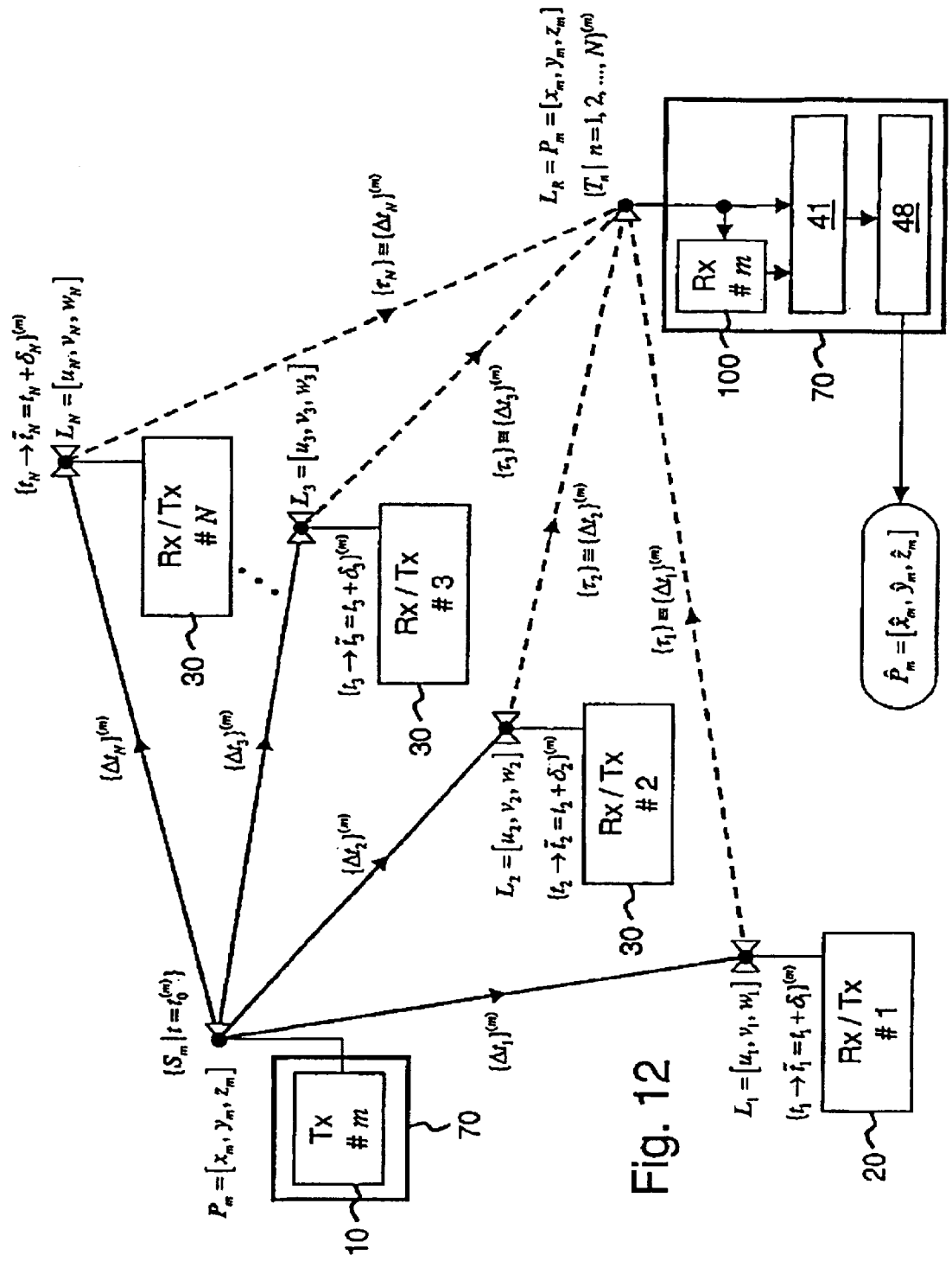
FIG. 12 shows a fifth embodiment.

FIG. 12 shows that all functions performed by the receive unit 100, the pre-evaluation unit 41, and the processing unit 48 can be incorporated in a common device 70 holding also the m-th first transmitter 10 (shown on the left side). In this case, the m-th mobile radio terminal or radio tag emitting the first signal $\{S\}$ can estimate its own location.

Figure 13:
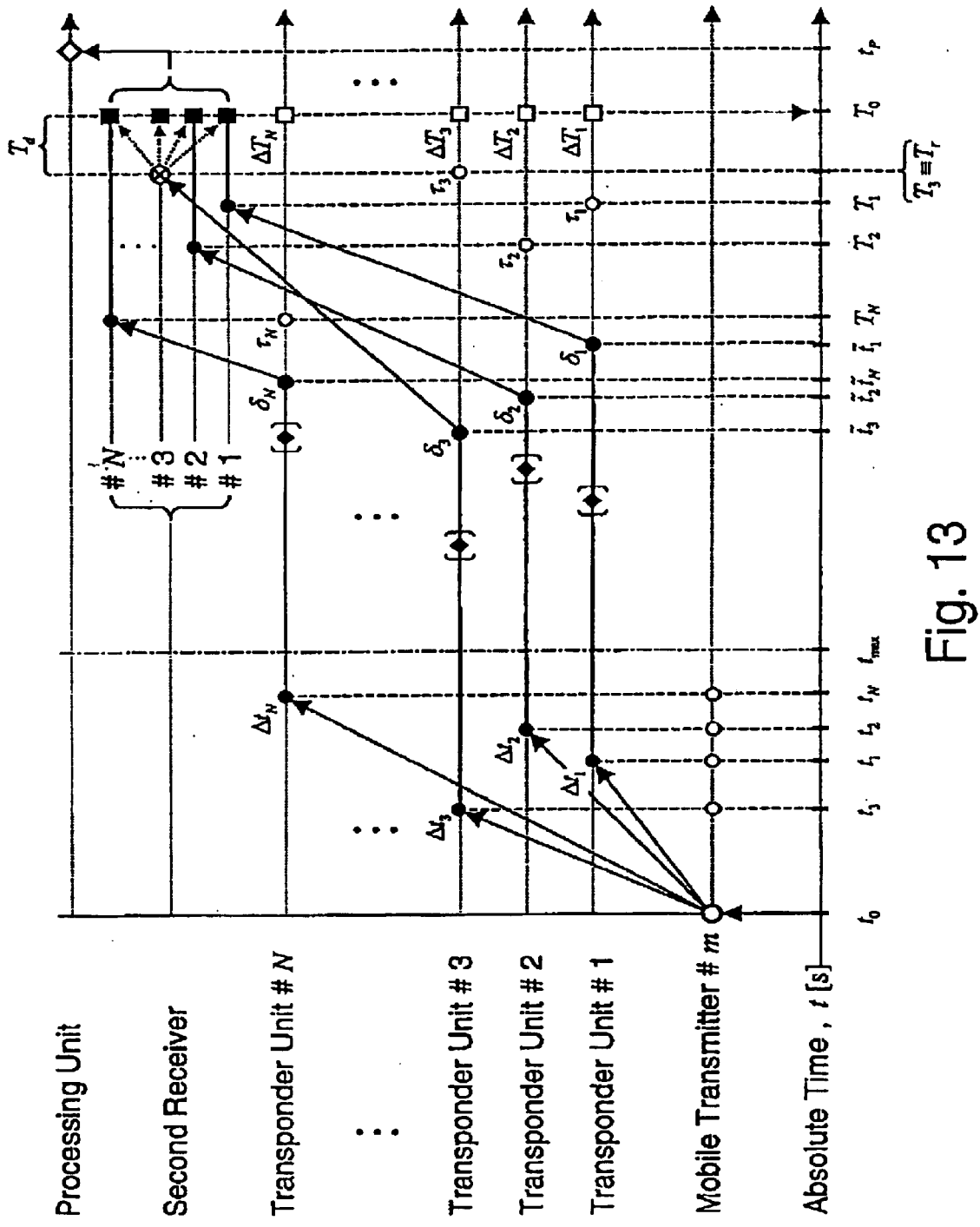
FIG. 13 shows a time diagram related to the first embodiment.

FIG. 13 shows a basic time diagram that relates to the first embodiment as illustrated by FIGS. 2 and 7. In particular, FIG. 13 illustrates the events that lead up to the single reference time event, $T_0$, that terminates the measurement cycle determining the TSTT for the signals associated with the mobile radio terminal or radio tag identifiable by index m. In this example, the signal path corresponding to transponder unit 30 #3 initiates termination of this measurement cycle based on the criterion that at time $t=T_3 \equiv T_r$ the evaluation unit 40 has received a sufficient number of second signals $\{\tilde{S}_n\}$ associated with the m-th mobile transmitter 10 #m, that can be a radio terminal or radio tag, such that a location estimate $\hat{P}_m$ can be computed. Thus, when $t=T_3 \equiv T_r$ the controller 46 schedules the reference time event time $T_0$ associated with mobile transponder unit 30 #3 to occur after the time interval $\Delta T_3$ at time $$t=T_0=T_r+T_d=T_r+\Delta T_3.$$

Thus, at time $t=T_0$, all second time counters or timer units 44, 54 associated with a particular identified mobile radio terminal or radio tag are stopped simultaneously such that the TSTT for each observed signal path can be determined from three adjacent time intervals, namely: $\delta_n^{(m)}$, $\tau_n^{(m)}$, and $\Delta T_n^{(m)}$. It is clear that FIG. 13 represents only an example. In a practical system, the controller 46 also executes similar respective operations for the entire set of mobile stations (radio terminals or radio tags) tracked by the system and identifiable by the index m=1, 2, ..., M, as well as for the entire set of transponder units 20, 30 identifiable by the index n=1, 2, ..., N. It is further understood that not all transponder units 20, 30 in the system process the first signal $\{S\}$ of a particular mobile radio terminal or radio tag. In fact, often there will be a larger number of transponder units 20, 30 available than would be necessary and sufficient for the processing unit 48 to compute an unambiguous estimate of a mobile station's location. For example, if N=8 transponder units 20, 30 are available, then sufficient TOA and TDOA measurements for two and three spatial dimensions can be obtained by using at most four and five of the first receivers 22, 32, respectively, of the set of eight that are available. In theory, three transponder units 20, 30 are necessary for two spatial dimensions and at least four transponder units 20, 30 for three spatial dimensions.

Figure 14:
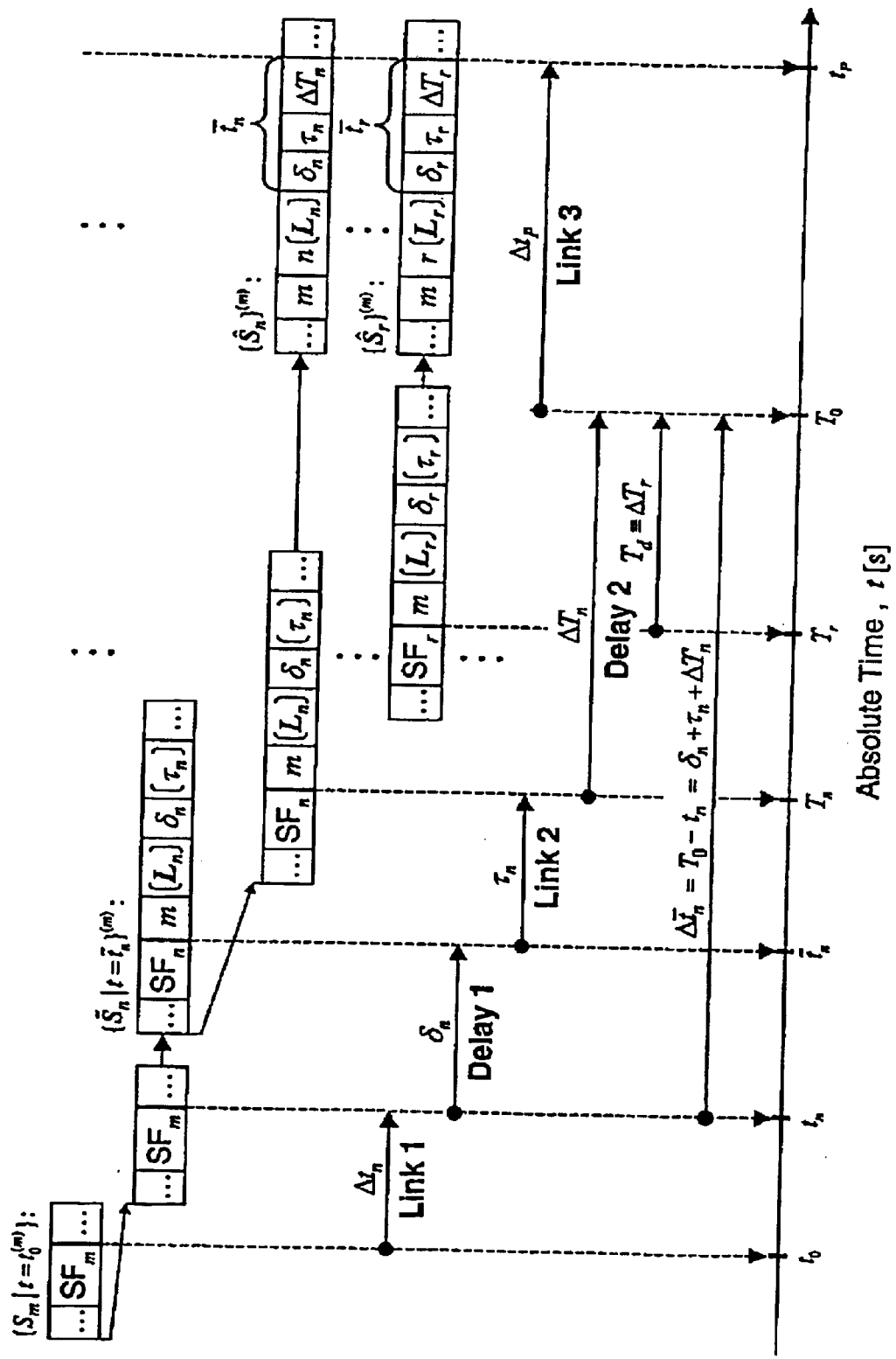
FIG. 14 shows the schematic structure and time alignment of the relevant signal frames that relate to the first embodiment.

FIG. 14 shows the schematic structure and time alignment of the relevant signal frames relating to the preferred first embodiment. Here, only those fields of a particular signal frame are indicated that have some relevance for an operational system. In particular, the figure shows that in agreement with the principles of CDMA, the frames of the first signal $\{S\}$ contain at least a synchronization field, hereinafter abbreviated to SF, that uniquely identifies and distinguishes the transmitting mobile radio terminal or radio tag from all other first transmitters 10. In the figure, this identification is indicated by the index m. Similarly, the figure also shows that in agreement with the principles of CDMA, the frames of the second signal {S̃} contain at least a synchronization field, hereinafter also abbreviated to SF, that uniquely identifies and distinguishes the particular first receiver 22, 32. In the figure, this identification is indicated by the index n. Thus, the second signal {S̃} includes at least: i) information for unique identification of the first receiver (index n), ii) information on the identity of the first signal source (index m), and iii) time interval "Delay 1" ($\delta_n$). Depending on the designer's choice, the specific known location $L_n$ of the second receiver 42, 52 and/or the previously determined second signal transition time on Link 2 ($\tau_n$) may also be directly included in the second signal frame. The third signal {Ŝ$_n$} includes at least: i) information on the identity of the first signal source (index m), ii) information on the identity of the second receiver (index n), iii) time interval "Delay 1" ($\delta_n$), iv) the previously determined second signal transition time on Link 2 ($\tau_n$), and v) the final second time count "Delay 3" ($\Delta T_n$). Alternatively, the third signal frame may also include the specific known location of the second receiver 42, 52 and/or the total sum consisting of three terms, i.e., Delay 1 ($\delta_n$), the previously determined second signal transition time on Link 2 ($\tau_n$), and Delay 3 ($\Delta T_n$). The known location $L_n$ of the second receiver 42, 52 could also be included explicitly in the third signal frame sent to the processing unit 48; alternatively, $L_n$ could be retrieved from storage elements attached to the processing unit 48 based on knowledge of index n (see also FIG. 3). A similar alternate mechanism could be designed for the previously determined second signal transition time on Link 2 ($\tau_n$). FIG. 14 also indicates how, for example, the timing phase could be defined and aligned within and between the different signal frames.

Any enclosed embodiment may be combined with one or several of the embodiments shown and/or described. This is also possible for one or more features of the embodiments. The steps herein described do not always need to be executed in the exact given order. The steps can be carried out, at least to some extent, in any other order.

What is claimed is:

1. Apparatus for determining a time of arrival ($t_n$) of a transmitted signal ({S}), the apparatus comprising:
   at least two transponder units, each comprising
      a first receiver for receiving the transmitted signal ({S}),
      a time-processing unit coupled to the first receiver for generating, in response to receipt of the transmitted signal ({S}) by the first receiver, a first time-count value ($\delta_n$), and for scheduling transmission of a time-processed signal ({Ŝ$_n$})), which is based on the transmitted signal ({S}), in dependence on the time-count value ($\delta_n$), and
      a transmitter for transmitting the time-processed signal ({Ŝ$_n$}) from a transmission location ($L'_n$); and,
   an evaluation unit comprising
      a second receiver for receiving the time-processed signal ({Ŝ$_n$}) after a determinable time-delay value ($\tau_n$),
      a timer unit coupled to the second receiver for generating, in response to receipt of the time-processed signal ({Ŝ$_n$}) by the second receiver, a second time-count value ($\Delta T_n$),
      a controller for generating a time reference ($T_0$) for the timer unit, and
      a processing unit for deriving the time of arrival ($t_n$) based on the time reference ($T_0$) from the first time-count value ($\delta_n$), the time-delay value ($\tau_n$), and the second time-count value ($\Delta T_n$).

2. Apparatus according to claim 1, whereby the time reference ($T_0$) is an absolute time reference.

3. Apparatus according to claim 1, whereby the transmitted signal ({S}) comprises a first transmitter identification information.

4. Apparatus according to claim 3, whereby the time-processed signal ({Ŝ$_n$}) comprises a second transmitter identification information, the first transmitter identification information, and the first time-count value ($\delta_n$).

5. Apparatus according to claim 1, whereby the determinable time-delay value ($\tau_n$) is derivable for a given geometrical arrangement of the transponder units.

6. Method for determining a time of arrival ($t_n$) of a transmitted signal ({S}), the method comprising the steps of:
   receiving the transmitted signal ({S}) at a predefined first receiving location ($L_n$);
   generating upon reception of the transmitted signal ({S}) a first time-count value ($\delta_n$) for scheduling the transmission of a time-processed signal ({Ŝ$_n$}) that is derived from the received signal ({S});
   transmitting the time-processed signal ({S$_n$}) from a transmission location ($L'_n$);
   receiving the time-processed signal ({Ŝ$_n$})) after a determinable time-delay value ($\tau_n$);
   generating upon reception of the time-processed signal ({Ŝ$_n$}) a second time-count value ($\Delta T_n$);
   generating a time reference ($T_0$); and
   deriving the time of arrival ($t_n$) based on the time reference ($T_0$) from the first time-count value ($\delta_n$), the time-delay value ($\tau_n$), and the second time-count value ($\Delta T_n$).

7. Method according to claim 6 further comprising deriving a time difference of arrival (TDOA) from more than one time of arrival ($t_n$) by calculating the difference.

8. Method according to claim 6, wherein the time-delay value ($\tau_n$) is determinable by sending a test signal.

9. System for determining a time of arrival ($t_n$) of a transmitted signal ({S}), the system comprising:
   a first transmitter for sending the signal ({S});
   at least two transponder units, each comprising
      a time-processing unit coupled to a first receiver that upon reception of the transmitted signal ({S}) generates a first time-count value ($\delta_n$) scheduling the transmission of a time-processed signal ({Ŝ$_n$}) that is derivable from the received signal ({S}),
      a second transmitter for transmitting the time-processed signal ({Ŝ$_n$}) from a transmission location ($L'_n$); and,
   an evaluation unit comprising
      a second receiver for receiving the time-processed signal ({Ŝ$_n$}) after a determinable time-delay value ($\tau_n$),
      a timer unit coupled to the second receiver that upon reception of the time-processed signal ({Ŝ$_n$}) generates a second time-count value ($\Delta T_n$),
      a controller for generating a time reference ($T_0$) for the timer unit, and
      a processing unit for denying the time of arrival ($t_n$) based on the time reference ($T_0$) from the first time-count value ($\delta_n$), the time-delay value ($\tau_n$), and the second time-count value ($\Delta T_n$).

10. System according to claim 9, whereby the signals ({S},{Ŝ$_n$}) are based on ultra wide band radio technology (UWB-RT) in combination with code division multiple access (CDMA) modulation.

* * * * *